(12) United States Patent
Kommareddy et al.

(10) Patent No.: US 8,397,284 B2
(45) Date of Patent: Mar. 12, 2013

(54) DETECTION OF DISTRIBUTED DENIAL OF SERVICE ATTACKS IN AUTONOMOUS SYSTEM DOMAINS

(75) Inventors: Chris Kommareddy, Seattle, WA (US); Samrat Bhattacharjee, Silver Spring, MD (US); Mark A. Shayman, Potomac, MD (US); Richard La, Gaithersburg, MD (US)

(73) Assignee: University of Maryland, College Park, MD (US)

( * ) Notice: Subject to any disclaimer, the term of this patent is extended or adjusted under 35 U.S.C. 154(b) by 1202 days.

(21) Appl. No.: 11/624,101

(22) Filed: Jan. 17, 2007

(65) Prior Publication Data

US 2008/0028467 A1   Jan. 31, 2008

Related U.S. Application Data

(60) Provisional application No. 60/743,132, filed on Jan. 17, 2006.

(51) Int. Cl.
*G06F 7/04* (2006.01)
(52) U.S. Cl. .................. 726/13; 726/11; 726/22; 726/23
(58) Field of Classification Search .............. 726/22–25, 726/11, 13
See application file for complete search history.

(56) References Cited

U.S. PATENT DOCUMENTS

| | | | | |
|---|---|---|---|---|
| 6,865,185 B1 * | 3/2005 | Patel et al. | ..................... | 370/412 |
| 7,123,583 B2 * | 10/2006 | Hoar et al. | ..................... | 370/230 |
| 7,134,143 B2 * | 11/2006 | Stellenberg et al. | ............ | 726/25 |
| 7,266,754 B2 * | 9/2007 | Shah et al. | ..................... | 714/776 |
| 7,487,541 B2 * | 2/2009 | Robert | .............................. | 726/22 |
| 7,526,807 B2 * | 4/2009 | Chao et al. | ....................... | 726/23 |
| 7,577,737 B2 * | 8/2009 | Fawcus | .......................... | 709/224 |
| 7,681,235 B2 * | 3/2010 | Chesla et al. | ..................... | 726/23 |
| 7,712,134 B1 * | 5/2010 | Nucci et al. | ...................... | 726/23 |
| 7,782,793 B2 * | 8/2010 | Olesinski et al. | .............. | 370/253 |
| 7,895,649 B1 * | 2/2011 | Brook et al. | ..................... | 726/22 |
| 2002/0035698 A1 * | 3/2002 | Malan et al. | ................... | 713/201 |
| 2004/0054924 A1 * | 3/2004 | Chuah et al. | ................... | 713/201 |
| 2004/0093521 A1 * | 5/2004 | Hamadeh et al. | .............. | 713/201 |
| 2004/0250124 A1 * | 12/2004 | Chesla et al. | .................. | 713/201 |
| 2005/0111367 A1 * | 5/2005 | Jonathan Chao et al. | ..... | 370/235 |
| 2005/0210533 A1 * | 9/2005 | Copeland et al. | ............... | 726/23 |
| 2005/0278779 A1 * | 12/2005 | Koppol et al. | ................... | 726/22 |
| 2007/0113284 A1 * | 5/2007 | O'Rourke et al. | .............. | 726/23 |
| 2008/0052774 A1 * | 2/2008 | Chesla et al. | ................... | 726/13 |

OTHER PUBLICATIONS

P. Phaal et al. RFC 3176: "InMon Corporation's sFlow: A Method for Monitoring Traffic in Switched and Routed Networks" © 2001 The Internet Society. (31 pages) http://www.rfc-editor.org/rfc/pdfrfc/rfc3176.txt.pdf.*

* cited by examiner

*Primary Examiner* — Edward Zee
*Assistant Examiner* — Thomas Gyorfi
(74) *Attorney, Agent, or Firm* — Rosenberg, Klein & Lee

(57) ABSTRACT

A denial-of-service network attack detection system is deployable in single-homed and multi-homed stub networks. The detection system maintains state information of flows entering and leaving the stub domain to determine if exiting traffic exceeds traffic entering the system. Monitors perform simple processing tasks on sampled packets at individual routers in the network at line speed and perform more intensive processing at the routers periodically. The monitors at the routers form an overlay network and communicate pertinent traffic state information between nodes. The state information is collected and analyzed to determine the presence of an attack.

9 Claims, 23 Drawing Sheets

FLOW RATIO FOR FLOW 1 = 2
FLOW RATIO FOR FLOW 2 = 4 ←——— ATTACK FLOW

| SEQ OF SAMPLED PACKETS | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| FLOW ID | 1 | 1 | 1 | 1 | 2 | 2 | 1 | 2 | 1 | 2 | 2 | 2 | 2 | 2 | 2 | 2 |
| PACKET DIR | O | I | O | O | O | O | O | O | I | O | I | O | O | O | I | O |
| COUNTER WHEN K UNBOUNDED | 1 | -1 | 0 | 1 | 2 | 3 | 4 | 5 | 3 | 4 | 0 | 1 | 2 | 3 | -1 | 0 |
| COUNTER WHEN K UPPER BOUNDED AT 3 | 1 | -1 | 1 | 1 | 2 | 3 | 4 | 5 | 3 | 4 | 1 | 2 | 3 | 4 | 1 | 2 |

FIG. 13

| FLOW ID | FLOW TYPE | EGRESS GATEWY | OUT RATE | INGRESS GATEWY | IN RATE |
|---|---|---|---|---|---|
| 00 | LEGIT, SYM | G1 | 10 | G1 | 20 |
| 01 | ATTACK, SYM | G1 | 40 | G1 | 2 |
| 10 | LEGIT, ASYM | G1 | 15 | G2 | 10 |
FIG. 19A
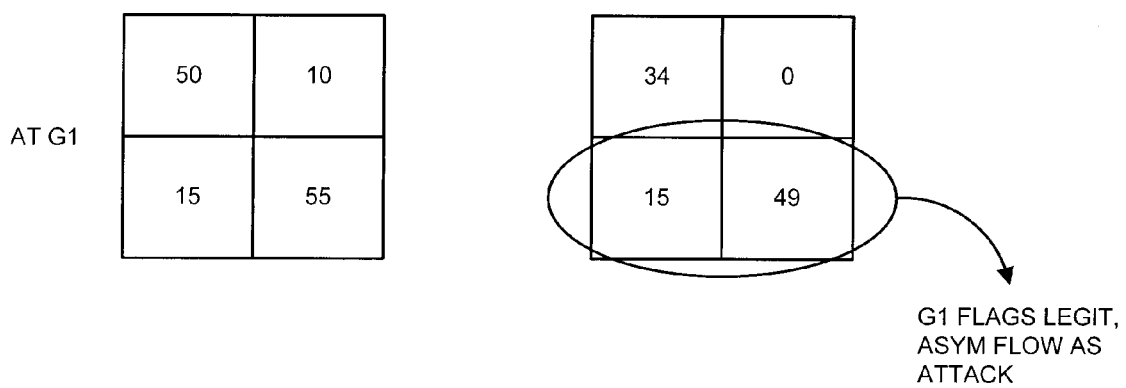
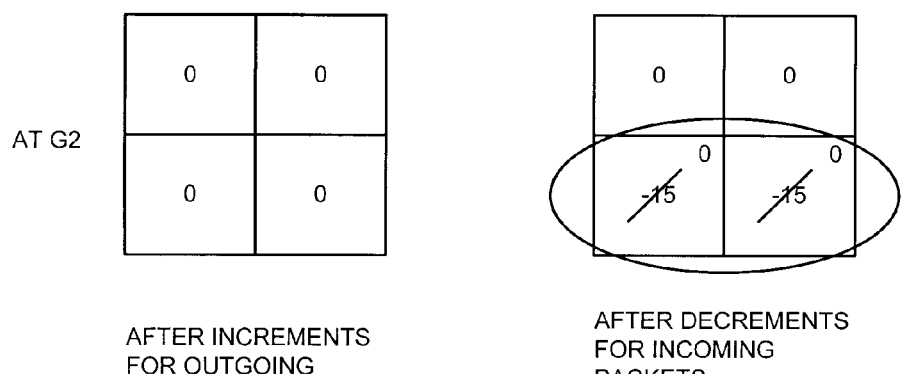
FIG. 19B

DETECTION OF DISTRIBUTED DENIAL OF SERVICE ATTACKS IN AUTONOMOUS SYSTEM DOMAINS

RELATED APPLICATION DATA

This application is based on U.S. Provisional Patent Application 60/743,132, filed on 17 Jan. 2006.

STATEMENT REGARDING FEDERALLY SPONSORED RESEARCH

The invention described herein was developed through research funded by the U.S. Government under contract number NSA MDA90402C0428. The U.S. Government has certain rights to the invention.

BACKGROUND OF THE INVENTION

1. Field of the Invention

The invention described herein is related to determining an amount of noncompliant traffic in a communication network for purposes of detecting a denial-of-service (DoS) attack. More specifically, the present invention monitors the ratio of incoming and outgoing traffic of traffic flows in a communication network to identify flows not conforming to the network transmission protocol, which is an indication of a DoS attack.

2. Description of the Prior Art

Information is conveyed over the Internet via datagrams that are directed from a source to a destination through a number of routers. The traditional routers on the Internet do not maintain a traffic flow state of the flows (a traffic "flow" generally refers to a stream of data packets emanating from the same source node and bound for the same destination node and which are transported along the same path) traversing the device. Whereas, the Internet routing architecture has served the Internet community well in terms of its simplicity, its scalability and its heterogeneity, a stateless routing mechanism does not distinguish between packets belonging to legitimate traffic and packets transmitted for malicious purposes. Identifying malicious hosts or preventing malicious traffic within the Internet has proven to be very difficult.

Denial-of-service (DoS) attacks belong to a class of malicious traffic that aims to disrupt service provided to legitimate users by a server on the Internet. DoS attacks are generally classified into two different categories: protocol weakness attacks and resource exhaustion attacks. Protocol weakness attacks succeed by exploiting the weaknesses in the protocol/application design or implementation of the network. In resource exhaustion attacks, denial of service is achieved by overwhelming the resources required to service legitimate clients.

Internet protocol (IP) packets are permitted by the protocol to have a maximum size of $2^{16}-1$ bytes. Due to fragmentation and reassembly of packets in the network layer, it is possible for a server to receive an IP packet that is larger than the maximum allowed size. If the server does not check the size of such a fragmented packet during its reassembly, then the server undergoes a buffer overflow during the reassembly process. The server fails and is unable to process any further service requests by legitimate clients. Such attacks are typically carried out by malicious hosts using Internet Control Message Protocol (ICMP) echo packets, or "ping" packets, and such an attack is thus referred to as the "ping of death". Ping of death attacks are successful when the system under attack does not check the size of the packet during its reassembly and, as such, this attack is an example of a protocol weakness attack.

In a transmission control protocol (TCP) "SYN" attack, on the other hand, success is achieved only when an attacker is able to send a large number of synchronization requests through TCP SYN packets. During a TCP compliant connection procedure, a client sends a SYN packet to a server and the server responds with a SYN-ACK packet. At that time, the server allocates resources for the TCP connection. The client replies to the server's SYN-ACK with an ACK packet to complete the connection setup phase. This procedure is often referred to as the TCP "three-way handshake".

If a server does not receive the expected ACK packet responsive to its SYN-ACK packet, it repeatedly resends the SYN-ACK packet and waits for the ACK packet at increasingly longer wait times between retransmissions. Meanwhile, the server's resources remain allocated in anticipation of a completed three-way handshake. Eventually, after a total wait time of three minutes, if the server still has not received the expected ACK packet from the client, it will free the allocated data structures and reset the connection. Due to the limited memory available for the TCP data structures, a server can service at most a fixed number of simultaneous connections. If an attacker sends numerous spoofed SYN packets, the memory available at the server will ultimately be exhausted and unable to accommodate new TCP connections. Consequently, the server will be unable to provide services to legitimate clients in that the communication session failed to be established. Such an attack is an example of a resource exhaustion attack since the attacker exhausts the memory resources at the server to prevent further TCP connection requests from being fulfilled. A SYN attack may also be considered an implementation weakness attack since the mechanism exploited for SYN attacks is a vulnerability of the TCP three-way handshake.

Bandwidth attacks, or flooding attacks, are executed by transmitting a large number of packets towards a victim. The communication links terminating at the victim become heavily congested and a significant portion of packets are dropped to relieve the congestion. Since the Internet routers are stateless and cannot distinguish between the legitimate packets and those packets that are part of the attack, both types of packets are dropped arbitrarily. The victim is consequently unable to service legitimate users trying to access its services. Bandwidth attacks are thus resource exhaustion type DoS attacks and may be performed using packets formatted as TCP packets, user datagram protocol (UDP) packets or some other IP packet.

Bandwidth attacks are a unique and important class of DoS attacks. First, the attackers are typically unwillingly-participating end hosts and the victims are typically server farms or enterprise commercial sites. The victims generally have more resources in terms of bandwidth and processing than the combined resources of a few individual end hosts. Hence, several attackers may participate in what is referred to as a distributed DoS (DDoS) attack. Additionally, because bandwidth attacks require a large number of attack packets to be successful, significant network resources are consumed along the entire attack path. Thus, the impact of a flooding attack is felt more widely in the Internet than other DoS attacks and large DDoS attacks result in global Internet instabilities. Finally, the large number of packets make defensive or corrective action at the victim very difficult.

The distributed nature of the attacks described above and the inability to distinguish attack packets from legitimate packets presents interesting and challenging technical problems. Due to the ease with which such attacks can be mounted and the extent of damage they cause, mitigating flooding attacks is an area of intense development and is critical to ensure stable functioning of the Internet.

For TCP compliant traffic, only a fraction of TCP bandwidth attack packets addressed to the victim reach their destination. The victim may respond to even fewer TCP packets because its resources in terms of processing and memory have been exhausted. A legitimate host attempting to communicate with the victim during the attack will perceive the network to be congested and will multiplicatively decrease its sending rate. Attackers, on the other hand, will ceaselessly send large numbers of packets to achieve the denial of service at the victim. Thus, the number of packets sent to the victim by the attackers greatly outnumber the number of response packets received by those attackers during the attack. If the source addresses of the attack packets are spoofed, respective response packets will not reach the attacking host and the ratio of attack packets to their corresponding response packets will be even larger at the attackers. This characteristic of TCP flooding attacks, and flooding attacks of other protocols, may be exploited as a detection device. However, such a detection mechanism must observe a flow's packets in both directions to correctly determine if the flow is legitimate. Otherwise, the system will erroneously report a legitimate flow as an attack.

Routing in the Internet is generally asymmetric, i.e., the path for packets of a flow in one direction is different than the path for packets flowing in the opposite direction. Hence, detection systems using packet ratios to detect attacks may be deployed only in stub networks, either at the source/attacker site of the flow (source domain detection) or at the destination/victim of a flow (victim domain detection). As used herein, a "stub" domain or network refers to a network having a predetermined network address space coupled to the Internet via a border gateway. A stub domain comprises an autonomous system (AS), i.e., a collection of IP networks and routers under the control of a single entity that presents a common routing policy to the Internet. For example, in the well-known border gateway protocol (BGP), each stub domain, or AS, has assigned thereto a unique AS number, or ASN, for use in BGP routing. The ASN thus uniquely identifies the stub domain on the Internet.

Several DoS detection and prevention mechanisms presently exist and are generally classified across many dimensions, such as deployment location, detection heuristic, type and level of infrastructure change, etc. Two of these approaches, known as MULTOPS and D-WARD, each use packet ratios on flows to detect attacks in stub domains. MULTOPS implements a router that maintains packet rate statistics for the traffic traversing the router using a 4-level 256-ary tree data structure, as is shown in FIG. 1. Each node 102, 104, 106, 108, 110, 112 in the data structure 120 corresponds to an IP prefix, as is shown in the Figure, where the position of the node determines the prefix it represents. For example, the third child of node 106 represents the prefix 4.2.*.*. Each node has 256 entries, each corresponding to one of the 256 children of the node. Each entry 125 includes three fields: an incoming packet count field, shown at 122, an outgoing packet count field, shown at 124, and a pointer to the child node, as shown at 126. Whenever a packet that maps to the entry, i.e., the packets address prefix, is the same as that of the entry, the entry's counter 122, 124 corresponding to the packets direction is updated. When a packet rate for a prefix reaches a certain threshold, the child node for the corresponding prefix is initialized. When the packet rate falls below a threshold, the node is contracted by deleting the node's children. In this manner, MULTOPS can be adapted through its data structure to track changing traffic characteristics of the stub domain as well as the resources available at the router implementing the MULTOPS scheme.

MULTOPS detects attacks using the ratio of outgoing and incoming packet rates for each prefix for which it maintains packet rate statistics. Whenever a node's outgoing-to-incoming packet rate ratio falls outside a predetermined range, the corresponding prefix is flagged and the packets from, or to, the prefix are dropped.

Among its shortcomings is that MULTOPS will miss reflector attacks if the attacker employs a large number of reflectors. In a reflector attack, the attacker sends packets to public servers (reflectors) throughout the Internet. These packets have the victim's address as the source address, i.e., the source addresses on the packets are spoofed with the victims address and are typically request packets, such as ICMP echo requests or TCP connection request packets, that generate a response from the servers. Since the source address for the request packets have the victim's address, all the response packets are sent to the victim. If the number of responses is high, the link corresponding to the victim's address will become congested. If the number of reflectors employed in the attack is high, the attack can be successful even if the number of request packets to each reflector is low. In such a case, MULTOPS will fail to track all of the individual flows to the reflectors and will be unable to detect the presence of the attack.

Another shortcoming of MULTOPS is that an attacker can exploit knowledge of legitimate flows to mask low-rate attack flows. For example, if flows to a.b.c.d and a.b.c.e are mapped to the same MULTOPS counter as an attack flow a.b.c.f and the rates of all three flows are low enough so that their combined rate will not result in a count that exceeds the threshold, the MULTOPS system will be unable to resolve the attack flow from the legitimate flows.

D-WARD is another source domain DoS detection system known in the art. D-WARD maintains a packet count at flow level, i.e., for each external destination, and at connection level, i.e., for each TCP connection. The technique uses different models to evaluate flows belonging to different protocols. For a TCP flow, it uses the packet ratio of the flow to determine if the flow is an attack. Whenever a flows packet ratio is greater than the threshold, D-WARD drops packets of the flow. Due to the connection level packet counts it maintains, D-WARD is able to selectively drop packets of the flow and thus penalizes only errant connections of the flow. D-WARD measures responsiveness to packet drops to determine if the flow is compliant with the TCP specification. Upon determination of a noncompliant flow, D-WARD limits the rate of the flow. D-WARD uses similar models for non-TCP protocols, such as ICMP and Domain Name System (DNS) traffic. D-WARD implements models for different applications that use UDP and applies those models on UDP flows to evaluate if the flows are legitimate. For other UDP flows which do not have a built-in application model or the application model cannot be determined, it applies rate limits to the flows.

D-WARD affords two configurations to handle detection in multi-gateway networks. In a first implementation, as shown in FIG. 2A, D-WARD capable routers are deployed at all gateways 212, 214 and these routers periodically exchange information over link 213 before flows and connections are classified. In a second implementation, shown in FIG. 2B, D-WARD capable routers 220, 222 and 224 are deployed within the source network at connection points between stub sub-networks and the rest of the source network behind gateways 216 and 218. In effect, each stub sub-network is treated as an independent stub domain.

D-WARD stores packet rate at per-destination and per-connection granularity. If attack packets are not spoofed, D-WARD can distinguish between legitimate traffic and attack traffic and selectively drop only attack packets. However, if attack packets are spoofed using other addresses in the domain, D-WARD may not correctly distinguish between attack and legitimate traffic. D-WARD maintains the flow and connection information in fixed size hash tables. This protects the D-WARD system from memory overflow and having to reinitialize memory. However, D-WARD still requires periodic checking of entries in the table to clear stale information, such as the state of inactive flows. Also, since D-WARD maintains per-flow and per-connection information, an attacker can exhaust D-WARD's memory resources by generating flows to arbitrary destinations and connections to arbitrary ports. D-WARD attempts to overcome such a situation by deleting records corresponding to flows that sent few packets and bytes when the data structures are 90% full. An attacker can use this mechanism to sneak its attack packets past the D-WARD system.

D-WARD cannot detect attacks directed against entire subnets. If several attackers participate in an attack, each attacker can send attack packets at a low rate and yet the attack would still be successful against D-WARD. If an attacker has multiple addresses to use in an attack, it can decrease the attack rate to individual addresses accordingly. Since D-WARD does not combine the analysis of different addresses in a subnet and since it uses hash tables of limited size, it can miss one or more flows belonging to the subnet attack and is then unable to prevent the attack from succeeding.

Given the shortcomings of the prior art, the need has been felt for a scalable DoS detection system that is deployable at a stub domain and that is robust against attacks directed to individual hosts as well as entire subnets.

SUMMARY OF THE INVENTION

In a first aspect of the invention, a method is provided for detecting malicious communication traffic at an autonomous system domain. Flows traversing at least one routing node in the autonomous system domain are aggregated into flow aggregates, where each of the flows includes incoming and outgoing packets. Packets are sampled from each of the flow aggregates during a predetermined time interval and at least a flow identifier of suspect flows in each of the flow aggregates is stored, where suspect flows correspond to a flow aggregate having a number of outgoing packets exceeding by a predetermined value a number of incoming packets. The flows are reaggregated into another plurality of flow aggregates after the predetermined time interval so that each of the other flow aggregates contains other than the flows of the previous flow aggregates. Packets are sampled from the other flow aggregates and least the flow identifier of other suspect flows in each of the other flow aggregates are stored. At least one flow identifier of the suspicious flows common to the flow identifiers of the other suspicious flows is identified and used to determine a flow identifier of an attack flow.

In another aspect of the invention, a method for detecting malicious communication traffic includes sampling packets of a plurality of flows at each of a plurality of routing nodes in the autonomous network domain. Each of the flows includes incoming packets having a common source address and outgoing packets having a common destination address. At each of the routing nodes, at least a flow identifier of suspect flows each having a number of the outgoing packets exceeding by a predetermined value a number of the incoming packets is determined. The flow identifier of suspect flows is transmitted from each of the routing nodes to at least one rendezvous node, where at least one flow identifier common to the suspect flows is identified and therefrom determined a flow identifier of an attack flow.

In yet another aspect of the invention, a system for detecting malicious communication traffic at an autonomous system domain having a plurality of routers addressable through at least one border gateway is provided. The system includes a plurality of monitors respectively coupled at least to each of a number of the routers. Each of the monitors receives a plurality of flows from a respective port of the corresponding router and each of the flows includes incoming and outgoing packets. Each monitor includes a per-packet processor forming aggregates of the flows in accordance with a mapping of respective flow identifiers thereof and sampling packets thereof in accordance with a predetermined sampling rate. The per-packet processor includes at least one counter for each of the aggregates to maintain a count therein responsive to a number of outgoing packets and a number of incoming packets. The per-packet processor also includes a record store storing a flow record for each suspect flow in each aggregate having the number of outgoing packets exceeding by a predetermined value a number of incoming packets. Each flow record has stored therein at least a flow identifier of the suspect flow corresponding thereto. The monitor includes also a periodic processor receiving the flow record for each suspect flow at predetermined intervals. The periodic processor computes a score for each suspect flow and compares the score with a predetermined threshold. The periodic processor provides the flow identifier of each suspect flow having a score exceeding the predetermined threshold, where a time between said periodic intervals is greater than said sampling rate.

BRIEF DESCRIPTION OF THE DRAWINGS

FIG. 13 is a table illustrating exemplary detection of subnet attacks in accordance with aspects of the present invention;

FIG. 19A is a table depicting flows for purposes of demonstrating aspects of the present invention;

FIG. 19B is a block diagram of counter operation under the flows depicted in FIG. 19A that indicate a false positive determination of attack;

DETAILED DESCRIPTION OF PREFERRED EMBODIMENTS

The present invention is a source-based detection system for deployment in multi-homed autonomous systems (AS), where traffic flows may enter and depart the domain using different border routers. The present invention is passive—it does not induce any packet drops or other techniques to determine protocol compliance and the present invention avoids interfering with the routers' fast path processing. Unlike the MULTOPS system and others, the present invention may be distributed such that traffic monitors are located throughout the AS. Thus, the invention may be adapted to arbitrary AS topologies and the system can easily be scaled to handle very fast access links. The present invention detects many types of flooding attacks, such as direct attacks, pulse attacks and reflector attacks, efficiently and with minimal false positives.

Prior to describing the exemplary embodiments, it is believed beneficial to first briefly describe the characteristics of a bandwidth attack and how such is executed through comprised host nodes. As previously indicated, bandwidth attacks direct a large number of useless packets towards the victim so as to congest the access link thereto. Consequent to such flooding, legitimate packets to the victim are dropped and other hosts on the Internet cannot access services provided by the victim. In most cases, the victim of a bandwidth attack is a well-accessed server and the attackers are compromised residential hosts acting as bots, i.e., an Internet applet designed to perform automatic tasks. Several bots generally participate in a bandwidth attack in order for the attack to be successful. A bot may be configured to send attack packets at a rate much lower than that of which it is capable in order to avoid being discovered by either the legitimate user at the bots location or to the Internet service provider (ISP) operator of the network under which the bot is executing. In such a low rate implementation, numerous, distributed bots are required to succeed in a successful DDoS bandwidth attack.

Figure 1:
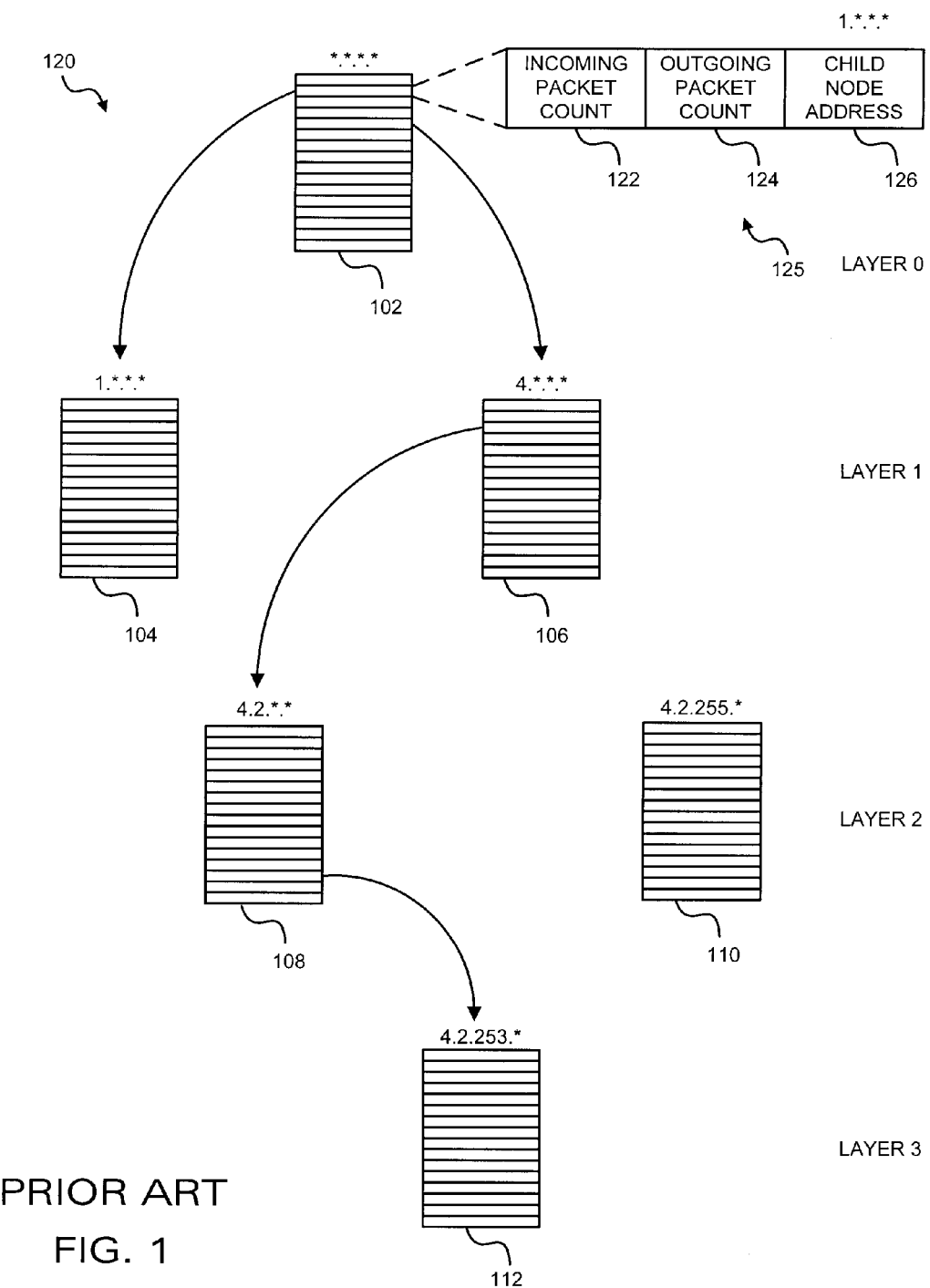
FIG. 1 is a block diagram of a data structure used in the MULTOPS detection system of the prior art.
Figure 2B:
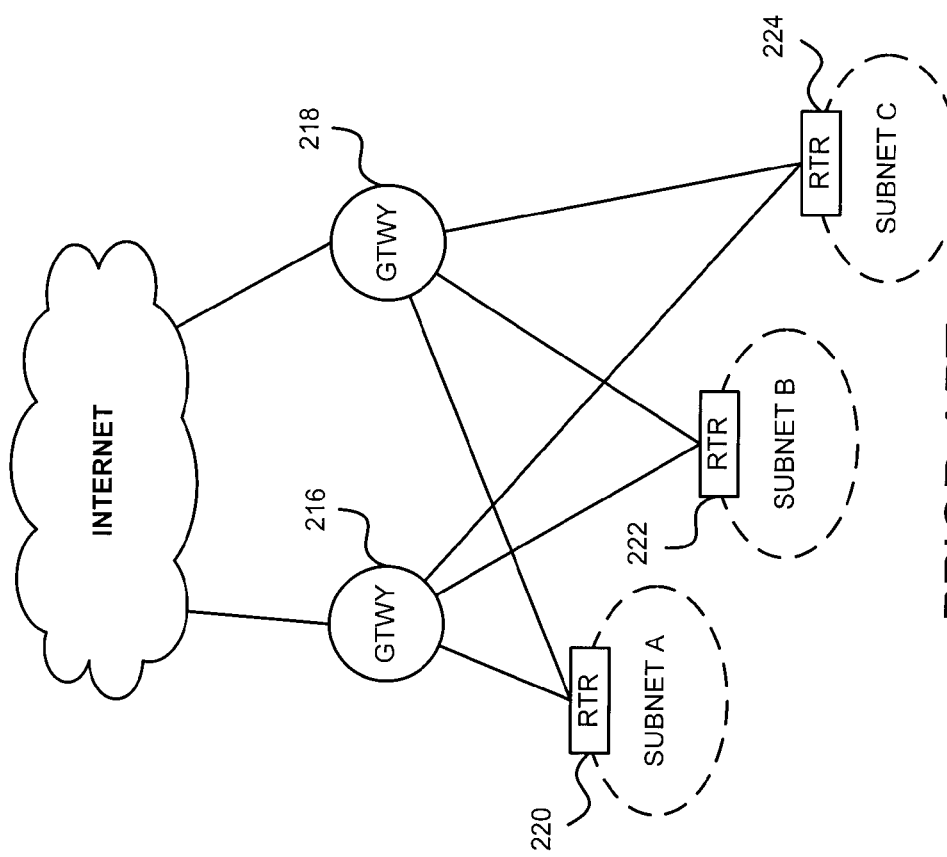
FIGS. 2A-2B are schematic block diagrams of the D-WARD detection system of the prior art.
Figure 2A:
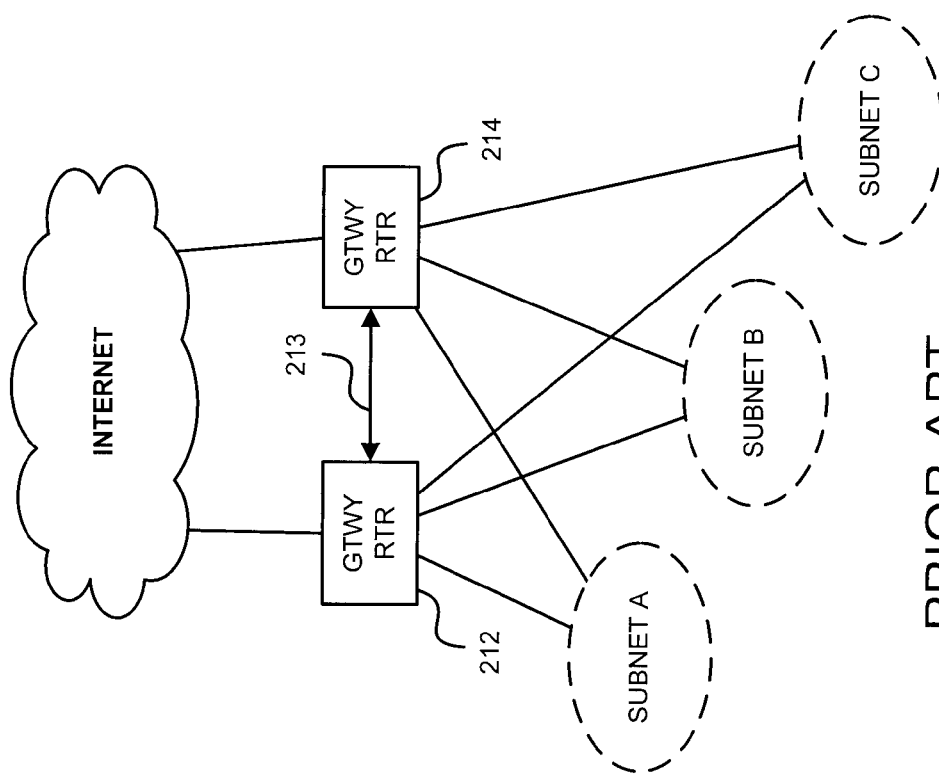
Figure 3:
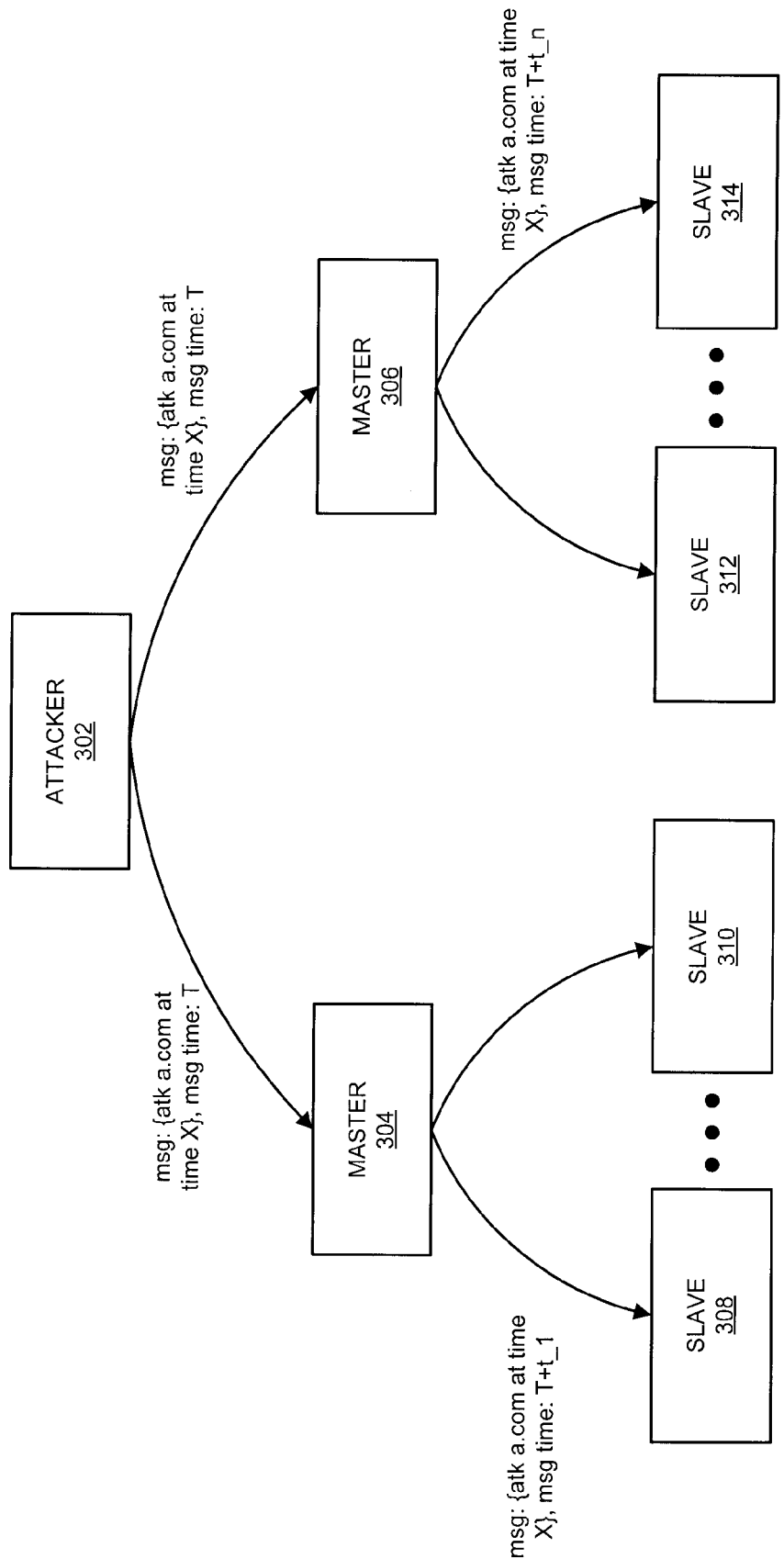
FIG. 3 is a diagram of actors carrying out precursors for a bandwidth DoS attack.

Executing a DDoS attack involves often elaborate initialization and setup procedures, a simplified discussion of which will now be provided with reference to FIG. 3. As is shown in the Figure, an attacker 302 gains control of a small set of compromised hosts referred to as "masters", as shown at 304 and 306. The attacker 302 uses the master host 304, 306 to discover slaves 308, 310, 312, 314 and to orchestrate the attack. For example, the master hosts 304, 306 may use automatic tools that scan the Internet for end hosts with certain security holes. Vulnerable machines are then compromised using the discovered security holes and are used as slaves. The attacker 302 communicates with the slaves 308, 310, 312, 314 through the masters 304, 306. The communication is typically carried out over Internet relay chat (IRC) channels to avoid detection of the conspiring elements. The attacker 302 relays to the master nodes 304, 306 the target of a bandwidth attack and the time at which the attack should commence. For example, as is shown in FIG. 3, the target a.com and the attack time X is relayed in an IRC message to the masters 304, 306. Master nodes 304, 306 in turn communicate this information to the slaves 308, 310, 312, 314. Typically, the message is propagated in a time spread manner to avoid suspicion. At the predetermined time X, the slaves 308, 310, 312, 314 carry out the bandwidth attack by sending a large number of attack packets, such as the TCP packets described below.

For purposes of demonstration, TCP will be used to describe elements of a bandwidth attack. It should be understood that other protocols are used to carry out a DDoS attack. The present invention is not limited to specific network architectures or protocols and the skilled artisan will recognize modifications to adapt the invention to other applications upon reaching an understanding of the inventive concepts disclosed herein. The scope of present invention is intended to embrace such modifications as well as alternative applications.

A TCP session between two end hosts is conducted over three phases: a connection-establishment phase, a data transfer phase, and a connection termination phase. The TCP connection establishment phase is initiated by a client sending a SYN packet and a server responding with an ACK packet. The server tags its own SYN packet to the corresponding ACK packet. The client replies to the server SYN packet with its ACK packet and the TCP connection is thus established. If a host misses the ACK packet it is expecting, it resends the SYN packet.

During the connection phase, the client informs the server of its window size, i.e., the number of bytes it is willing to accept from the server at the time the client sent the packet to the server. The window size is referred to as the client's advertised window. Similarly, the server advertises its own window to the client in a packet sent thereto.

After a connection is established, the client (receiver) sends a request to the server (sender) and the server acknowledges the request with an ACK packet. The server at this point is said to be in "slow start" phase, in which state the server should determine the packet transmission rate that the network can sustain without packet loss. The server maintains a variable referred to as the congestion window, sometimes abbreviated as cwnd, to store the number of unacknowledged packets that the server sent to a client in the network. Upon establishing the connection, the congestion window is set to 1. The server increments cwnd by one for every ACK packet it receives from the client. The sender can transmit up to cwnd or the receiver's advertised window, which ever is less, where the minimum of the two windows is referred to as the sending window.

The client, on the other hand, uses delayed acknowledgements. Upon receiving a data packet and before sending the corresponding ACK packet, the client waits for up to 200 ms to determine if some other data packet needing to be sent within that 200 ms wait period can carry the ACK. This eliminates the need to send the ACK in a separate packet. However, if the client receives another data packet from the server, it must ACK the two outstanding packets immediately without delaying transmission of an acknowledgement. Thus, the client must send an acknowledgement in a packet within the period spanning the time it receives at least every other packet. In a legitimate TCP connection, excluding consideration of packet loss, the outgoing-to-incoming packet ratio is thus between 0.5 and 1.0 at the receiver and between 1.0 and 2.0 at the sender. In general, a TCP connection without packet loss will have a ratio between 0.5 and 2.0 at each of its end hosts.

When the TCP connection undergoes packet loss, the sender can determine that one of its sent packets was not delivered in one of two ways. First, the sender counts the number of acknowledgement packets it receives, and if three or more duplicate acknowledgements were received for a single packet sent, it is assumed that the packet was not delivered. Second, if the sender transmitted the packet, but did not receive an acknowledgement therefor within a predetermined period of time, the packet is assumed to be undelivered. When the sender discovers that a packet has been dropped, it sets a variable referred to as ssthresh to half of the size of the sending window. If the sender discovers the packet loss was due to non-receipt of an acknowledgement, it sets is congestion window (and hence, the sending window) to unity. If the congestion window is less than or equal to ssthresh, the connection will function as if it is performing a slow start. During this phase, the sender increments its congestion window by one for each acknowledgement packet it receives. Slow start continues until the congestion window becomes greater than ssthresh. Whenever the congestion window is greater than ssthresh, the connection will be in a congestion avoidance state. During congestion avoidance, the sender increments the congestion window cwnd by at most one packet for every packet roundtrip time. Thus, for each acknowledgement the sender receives during the time it is in its congestion avoidance state, the sender increments cwnd by 1/cwnd. Since the sender may have at most cwnd outstanding acknowledgements, it can increase cwnd by at most one packet for each roundtrip period, when in congestion avoidance state. It is to be understood that the connection will be in congestion avoidance state even when the packet loss is discovered due to duplicate acknowledgements, since even then the congestion window will be greater than ssthresh.

During a period of occasional packet loss, the sender transitions into its congestion avoidance state and reacts to packet loss by increasing the sending rate at a much slower rate than during the beginning of the connection. When the packet loss is relatively frequent, the connection may discover the packet loss through duplicate acknowledgements, but will eventually realize the existence of the packet drops through non-receipt of acknowledgements. Then, the connection will reinitialize in slow start phase and transition into its congestion avoidance state when the congestion window size is half the size of when the packet loss occurred. In congestion avoidance state, the sending rate is slowly increased so that no more packets than the network's forwarding rate are transmitted. If the packet loss is severe, the sender will discover the packet loss by non-receipt of acknowledgements. In that case, ssthresh will be reduced and eventually the rate at which packets can be transmitted without packet loss will be determined. If the packet losses are extreme, which is usually the case during a bandwidth attack, the sender will receive very few acknowledgements for the packets it sends. The effective packet rate of the connection will be very low. If the sender does not receive an acknowledgement even for a duplicate packet it sent, it increases the time between the packet retransmissions from 1 second to 3 seconds to 6 seconds and so on. Eventually, the sending rate at the sender will become the minimum possible.

Figure 4:
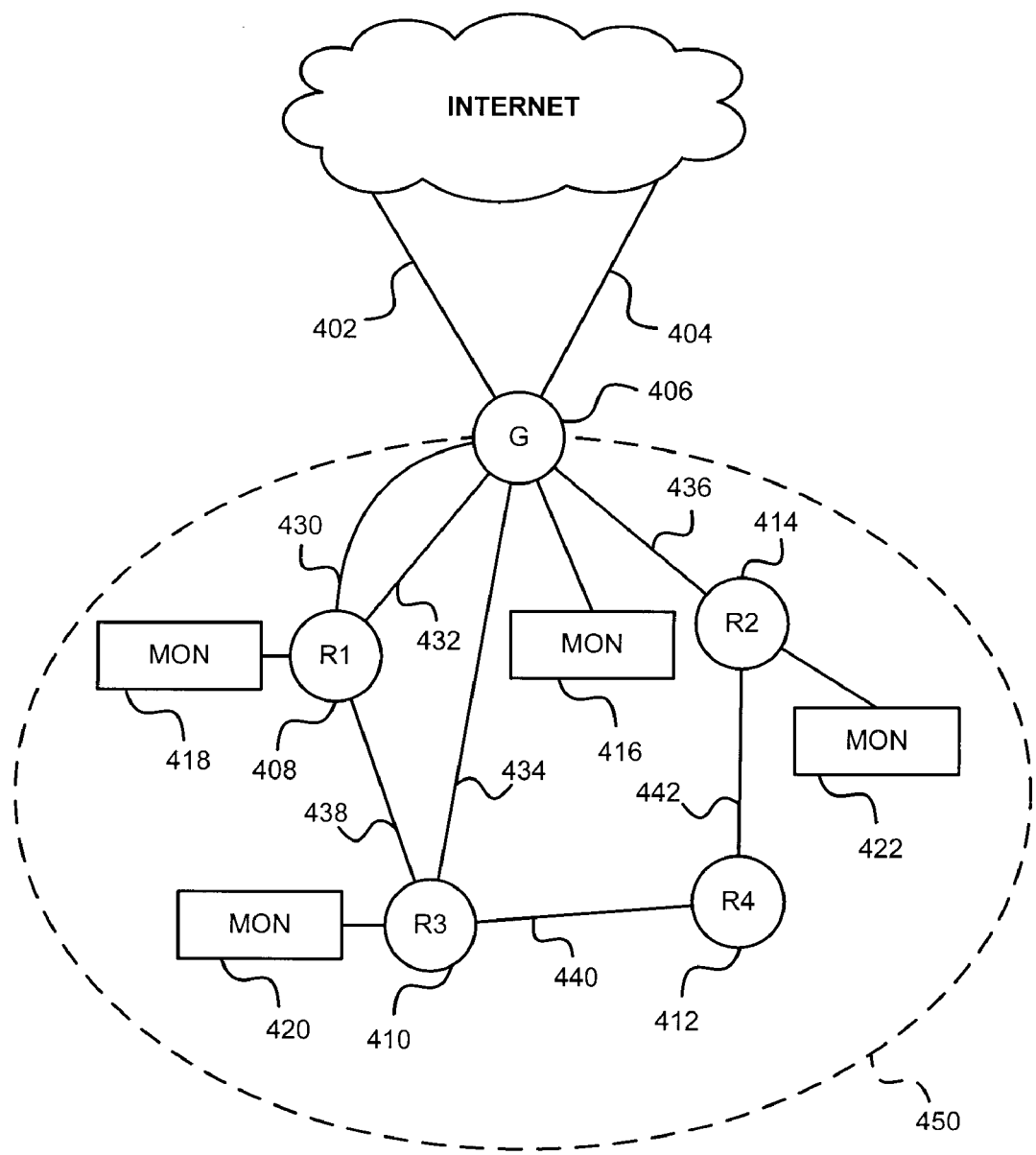
FIG. 4 is a schematic block diagram of an exemplary overlay network configured to carry out aspects of the present invention.

Referring now to FIG. 4, there is shown an exemplary network configuration suitable for carrying out embodiments of the present invention. As is shown in the Figure, the system includes a set of overlay nodes 416, 418, 420, 422 distributed at routers 406, 408, 410, 412, 414 within a stub network 450. The overlay nodes 416, 418, 420, 422 monitor network traffic through randomly sampled packets and detect thereby the presence of malicious traffic indicative of a DoS attack. The overlay nodes deployed within such a network are referred to herein as in-network overlay nodes and, in the context of the present invention, will be alternatively referred to as monitors 416, 418, 420, 422. Each monitor 416, 418, 420, 422 is associated with a particular router 406, 408, 410, 412, 414 in the AS and, as such, unless otherwise noted, a router described herein will refer also to its associated monitor. The collection of monitors 416, 418, 420, 422 may be connected through virtual or logical links to form an overlay network. The monitors 416, 418, 420, 422 may thus communicate one with another through datagrams routed over the virtual links. This may be accomplished through distributed hash tables or other suitable technique.

The monitors 416, 418, 420, 422 of the present invention beneficially maintain state information of flows that traverse the associated router 406, 408, 410, 412, 414. In one embodiment of the present invention, the monitor accesses packets of the router using line taps at, for example, the router's interface card. A line tap is a specialized hardware device that is deployed at a routers interface, or ports, and provides access to the traffic at those ports. A simpler mechanism that does not require additional hardware embodies the router to port-mirror its traffic. Also known as "port spanning", a router having port-mirroring capability duplicates the traffic appearing at one or more of its ports and directs the duplicate traffic onto a mirror port. The monitor accesses the packets traversing the router via the mirror port. For purposes of description and not limitation, it will be assumed that the routers 406, 408, 410, 412, 414 port-mirror their traffic and the monitors 416, 418, 420, 422 access packets through the mirrored port.

In accordance with certain aspects of the invention, the monitors 416, 418, 420, 422 are configured to detect attacks where the victims are outside the network 450. As such, the monitors 416, 418, 420, 422 require access to external or non-local packets. External packets are those that are destined to or received from external hosts and, conversely, a local packet is one that is exchanged between two end hosts both located within the stub AS 450. Hence, a router has only to mirror links that lie on the path between the router and the AS gateway(s) 406. As is shown in FIG. 4, at router 408, links 432 and 430 lie on the path between itself and the network gateway 406, using a hop count as a distance metric for routing in the network. Hence, router 408 has only to mirror traffic on these two links for monitor 418 to access external packets. Similarly, router 414 must only port-mirror link 436 and router 410 must only port-mirror link 434. The gateway 406 port-mirrors its external links 402 and 404. In certain embodiments, each router uses gateway addresses in its routing table to determine which links lie between itself and the gateways to identify the ports that have to be port-mirrored. Given these considerations, for simplicity, the term "flow" in context of the present invention refers to a stream of data packets bound for a common destination outside the AS 450.

Choosing port-mirror links in accordance with their local or external traffic as described above excludes links that may carry significant local traffic. However, port-mirror links at non-gateway routers may transmit local as well as external traffic. Thus, monitors can decrease their processing overhead if they can easily identify local packets among port-mirrored packets. If a monitor knows its router's routing table and the AS topology, for example, if the AS has a contiguous block of IP addresses for its hosts, the monitor can classify a packet as local or external by comparing the source and destination IP addresses against the block addresses. If both IP addresses in a packet are within the AS's block of IP addresses, the packet is considered local and external, otherwise. If only the destination IP address is within the address block, the packet is considered incoming and if only the source IP address is within the block the packet is considered outgoing.

If the AS is not implemented through a contiguous block of IP addresses, the monitor may use the routing table and the network topology to classify the packets. In certain embodiments of the invention, the monitor considers a packet as outgoing if it will be routed into one of the AS's gateways and incoming otherwise.

In accordance with certain aspects of the present invention, a monitor receives port-mirrored traffic from its corresponding router and performs simple tests to identify anomalous traffic flows at line speeds. In addition to performing this local determination, monitors deployed within the AS compare their suspects with one another and collectively determine which suspects are indeed attacks. The monitors collaborate via the overlay network, as described above.

Figure 5:
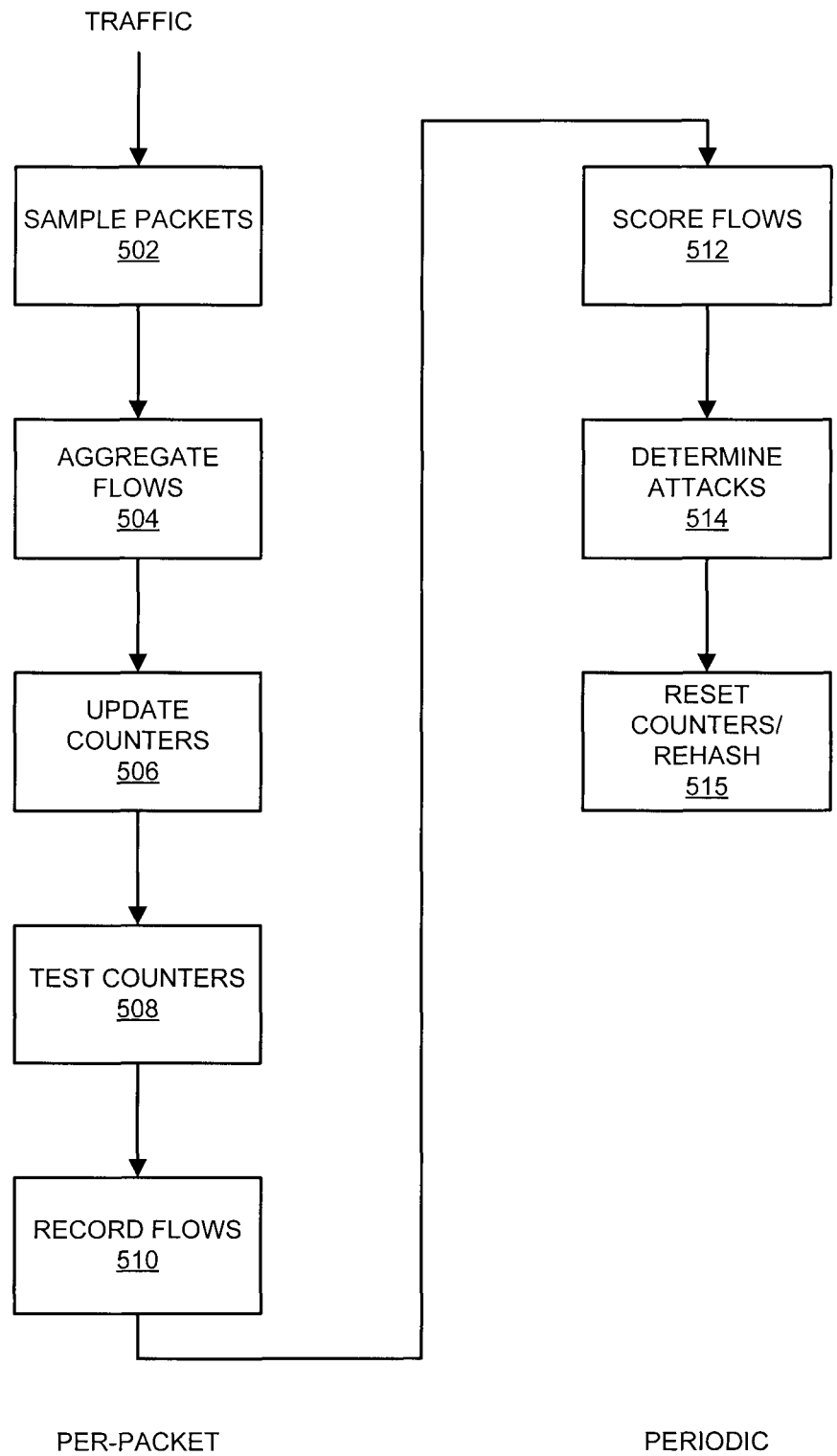
FIG. 5 is a flow diagram of exemplary method steps for carrying out traffic monitoring in accordance with the present invention.

FIG. 5 depicts an exemplary detection process consistent with the present invention. As is shown in the Figure, the process is divided in a per-packet processing flow and a periodic processing flow. The per-packet processing beneficially consists of a few simple functions such as mapping a packet to a flow aggregate, i.e., a collection of flows whose properties are considered together, updating counters associated with the aggregate and performing lightweight tests on the counters. At regular intervals, a monitor of the present invention performs more complex functions in the periodic processing component to detect anomalous flows and to detect attacks. It is to be understood that while the steps illustrated in FIG. 5 are shown as having a particular order of operations, the invention is not limited to such ordering. While the nature of the divided per-packet and periodic processing may impose a completion of per-packet processing prior to periodic processing, the steps of either process may proceed in an order other than that shown and many of the steps in either process illustrated are preferably executed in parallel.

A monitor's per-packet processing component creates a set of suspects by passively observing the packets at its associated router. For each flow, it counts the outgoing and incoming packets and compares the outgoing-to-incoming packet ratio against a threshold referred herein as the attack threshold to determine if the flow is anomalous. In that monitors may encounter large traffic volume, the per-packet processing uses a "fast memory", i.e., memory with low data access latency. Size limitations of fast memory may make it infeasible for a monitor to have counters for all flows. Instead, the monitor randomly groups flows into flow aggregates and counts incoming and outgoing packets on a per-aggregate basis. The monitor tests the outgoing-to-incoming packet ratio of a flow aggregate against the attack threshold and if the test fails, records all flows that map to that flow aggregate. An aggregate fails the test only if it has an anomalous flow. These aggregates are called suspicious and the flows that map to such aggregates are marked suspicious, also. Suspicious flows are reported to the periodic processing component of the monitor, which performs further analysis and determines attacks from amongst the list of suspect flows. The periodic processing occurs in "slow memory", which may be implemented in lower cost memory.

Referring now to FIG. 5, it is shown that the traffic flows are first sampled, indicated at block 502. The sampling rate is selected to be low enough for the monitor to process the packets, but high enough for the monitor to quickly capture the traffic profile at the router. In certain embodiments, the sampling rate is set as follows. If the monitor is able to process only m packets every second, e.g., if the monitor processing is the bottle-neck and the monitor takes c processing cycles to process each packet, then processing capacity m will be 1/c. If the instantaneous aggregate packet arrival rate of the port-mirrored links at a monitor is r packets per second, then the monitor sampling rate would be m/r. Since the instantaneous packet arrival rate may vary with time and the actual value is not known beforehand, the aggregate packet rate is determined frequently at short intervals and the sampling rate is recomputed accordingly. Thus, each monitor may have different sampling rates as determined by the packet arrival rate at that monitor. It is considered a beneficial feature of the invention that packet sampling is performed uniformly at random so as to avoid biasing the flows or, worse, allowing an attacker to determine how to make its traffic invisible to the monitor.

The per-packet processing proceeds to block 504, where flows are aggregated to obtain the flow aggregate's states. An aggregates state is maintained in fast memory as a bin, and as such, the terms "flow aggregate" and "bin" are used interchangeably herein. A bin consists of two counters tracking the number of the flow aggregate's incoming packets and the number of the aggregate's outgoing packets, where incoming and outgoing refer to direction taken with respect to the stub AS, as described above. Each monitor maintains a fixed number of bins and each bin corresponds to one or more flows. In certain embodiments of the invention, the number of active flows at the router and the number of bins at the monitor determine the flow aggregation rate at the monitor.

Each monitor is preconfigured with a hash function, which it applies on the external IP address, i.e., the destination address for outgoing packets and the source address for incoming packets, to map the packet to its corresponding bin. For each sampled packet, the monitor maps that packet to its appropriate bin through the hash function and increments the corresponding counter in accordance with the packet's direction, i.e., incoming or outgoing, as is indicated at block 506.

At block 508, the counters are tested to calculate an incoming-to-outgoing traffic ratio and to compare that ratio with the attack threshold. In accordance with recognized standards, legitimate TCP traffic has a data-to-ACK packet ratio of no more than 2. On the other hand, flooding attacks often exhibit packet ratios that are well beyond 2. In certain embodiments of the present invention where the object is to determine if the AS contains the source of an attack, it is thus unnecessary to evaluate incoming packets. When so embodied, each time a monitor processes an outgoing packet, it determines if the ratio of the corresponding bins outgoing counter to its incoming counter exceeds a pre-defined attack threshold R, e.g., R>2. If so, the monitor flags the bin. In certain embodiments of the invention, R is set slightly higher than 2 to take into account dropped ACK packets and variations due to the random packet sampling. If the ratio of the flow aggregate is greater than R, the bin, and each flow mapped to that bin, is said to be suspicious.

Upon the determination that the bin is indeed suspicious, a flow record corresponding to the packet's flow is created in fast memory, if such a record does not already exist, as shown at block 510. Advantageously, the bin ratio is checked for every outgoing packet so that the monitor can dynamically collect information regarding suspicious flows without storing information for all flows. In certain embodiments of the present invention where the monitor knows the identities of all flows at the router, ratio comparison is performed periodically rather than for every packet. The monitor maintains its ability in such embodiments to identify suspicious flows, but trades processing overhead for lower fast memory requirements.

Figure 6:
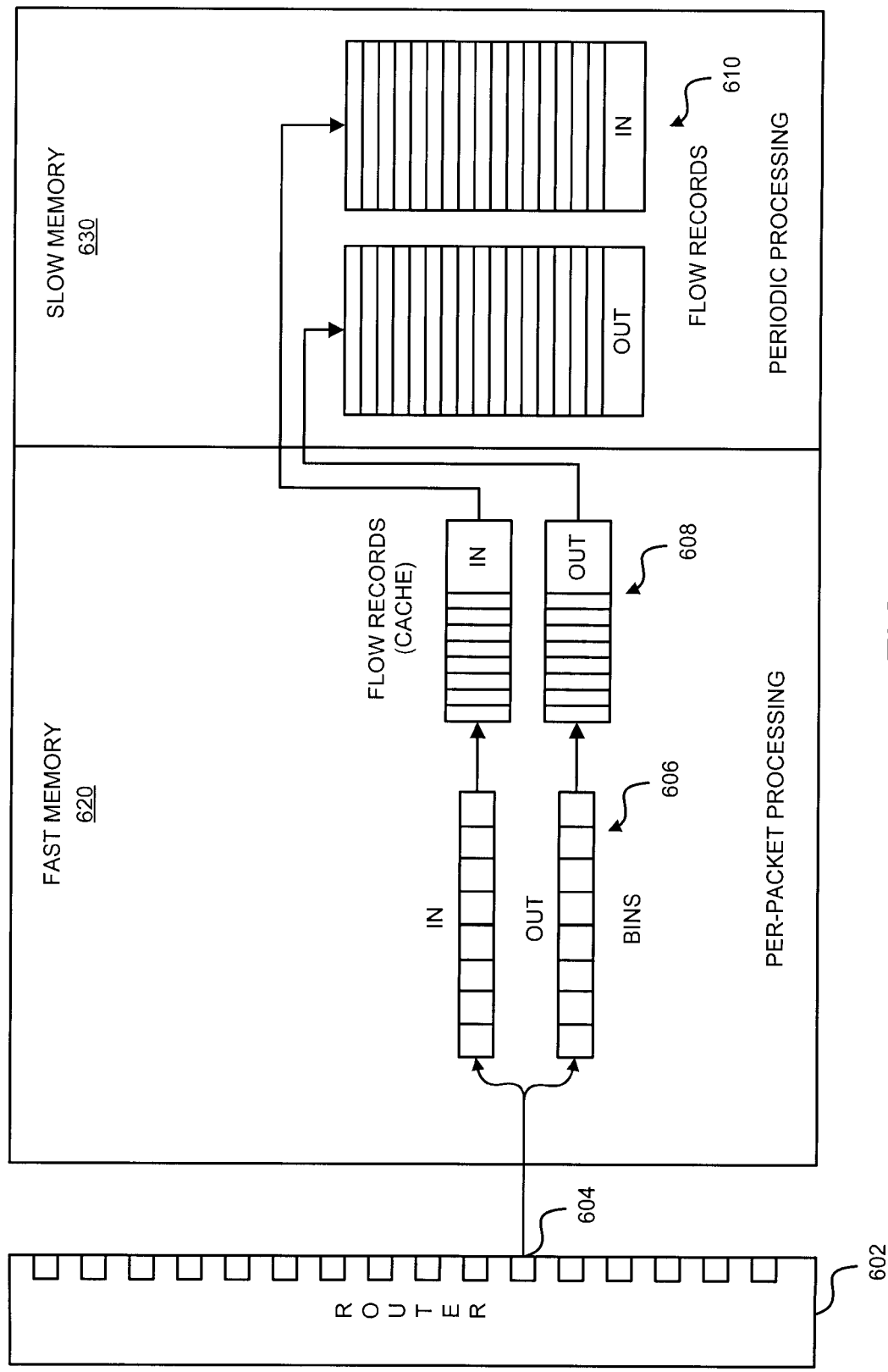
FIG. 6 is a simplified schematic diagram of exemplary components for carrying out attack detection in accordance with aspects of the present invention.

The present invention periodically processes the flow records from the per-packet processing and determines which, if any, of the suspect flows are indeed attacks. To avoid filling up fast memory, certain embodiments move records to slow memory either periodically or whenever there is not enough space in fast memory. Flow records are used to record suspect flows and a suitable measure or score of their abnormality. Referring to FIG. 6, the fundamental components for an exemplary embodiment of an attack detection system consistent with the present invention are shown in schematic block diagram form. Port-mirrored traffic from the router 602 is provided to the per-packet processing by way of a mirrored-port 604. As previously described, packets sampled from the aggregate flows are counted into bins 606 and suspect flows are reflected in flow records 608. The flow records of suspicious flows are then transferred to slow memory 630 for periodic processing, as is shown at 610. The flow records 610 are scored, as will be described below, and it is from that score that an attack is determined.

Returning now to FIG. 5, the flow records are transferred from the per-packet processing component to the periodic processing component, where the flows are scored at block 512. Flow records, when created, contain no information that indicates which of the included flows may be anomalous. Each flow mapped to a flagged bin is an equally likely candidate. To classify the flows as either legitimate flows or attacks using the flow records, the present invention periodically scores suspicious flows with a flow score. The flow score, or simply "score", ascertains a measure of to what extent a given flow is anomalous by recording its corresponding bin's packet ratios across multiple rehash intervals, which is the period over which a hash function is in effect prior to a new hash function being established, as is described further below. For a flow f, the score is initially set to 0. Every predetermined update period, for example, every second, the flow score is incremented by a difference between the ratio, $r_f$, of the bin mapped to f through the current hash function and the attack threshold R. Since $(r_f - R > 0)$ only if the bin is suspicious, the score for f is incremented only if it is mapped to a suspicious bin in successive rehash intervals. This occurs only if the flow is an anomalous flow. Hence, rehashing is an integral part of flow scoring, as will be described in further detail.

If the score crosses a score threshold, the record is further processed, as will be described below, and the record is deleted when the score reaches 0. It is believed a beneficial feature of the flow scoring described here that the attack intensity is captured by the flow score value. If the flow rate of an attack is high, $r_f$ will also be high, the score is incremented more and will cross the threshold earlier.

As is shown in FIG. 5, the scored flows are provided to process of block 514 at which the attacks, if any, are determined. Each monitor may have its own list of suspect flows that have exceeded the score threshold. Some of these suspects may actually be legitimate flows, i.e. not belonging to an attack, however, most of the suspect flows that are not attacks are eliminated from consideration via rehashing and scoring operations.

At predetermined time intervals, the present invention may generate new hash functions for the per-packet processor and collaborate with other monitors to vote on which suspects are attackers. In certain embodiments, for example, flow scores are calculated every second and hash functions are reset every five seconds. Each monitor may forward its records of suspect flows to the monitor corresponding to the next hop router on the flow's path. Additionally, the monitor forwards any records it has received from its previous hop monitors to respective next hop monitors. The last monitor on the path serves as a rendezvous node and is then in possession of a complete list of suspect flows and may perform detection processing thereon. For example, a logical intersection of the suspect lists received from the various monitors along the path may be performed using the flow identifier in the flow records. The monitor at the rendezvous node reports the result of these intersections as attacks to the detection system.

In certain embodiments of the invention, for a flow to be considered an attack, it must have been a suspect at each monitor on the path from the attacker to the network gateway. Since a legitimate flow is unlikely to be both mapped with an anomalous flow and flagged suspicious at every monitor on the path, the resulting intersection produces an indication of only those flows belonging to the attack.

Figure 7:
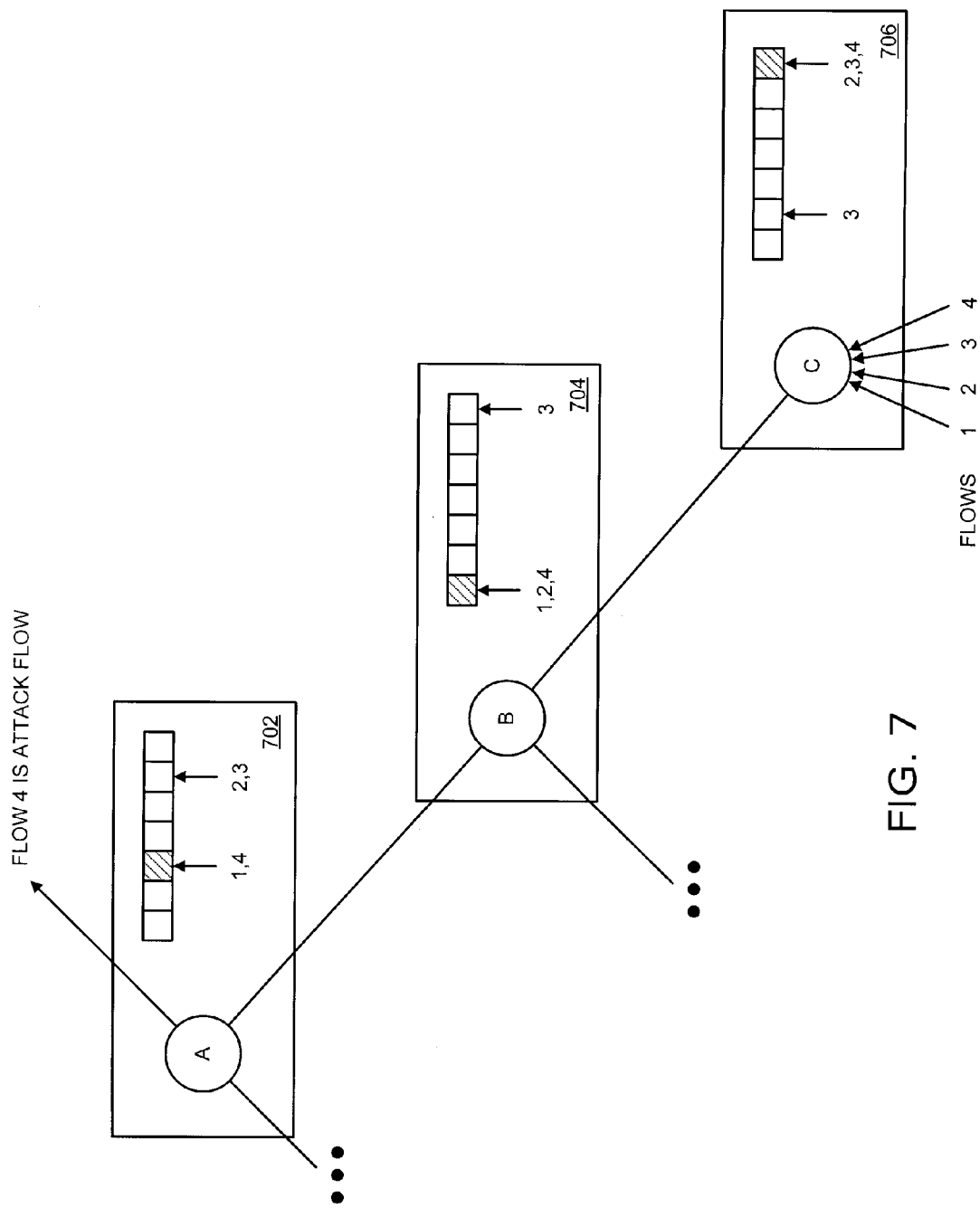
FIG. 7 is a block diagram illustrating an exemplary intersection mechanism for detecting attacks in accordance with aspects of the present invention.

An exemplary embodiment of an intersection procedure is illustrated in FIG. 7. Each monitor 702, 704, 706 has detected anomalous activity represented in the Figure by the shaded box, which indicates a bin having an incoming-to-outgoing packet ratio exceeding the threshold R. Each monitor has its own list of suspects: monitor 702 has $\{1, 4\}$, monitor 704 has $\{1, 2, 4\}$, and monitor 706 has $\{2, 3, 4\}$ as respective suspect flow lists. In the embodiment shown, 702 is the topmost, or last, monitor on the path to the egress point and thus serves as the rendezvous node to collect all lists from each of the three monitors and to perform the intersection. The intersection produces the final and correct suspect list of $\{4\}$, which is reported as the attacker.

In certain embodiments of the invention, a voting protocol is used to decrease the detection time and increase the detection rate. In that each monitor has a different sampling procedure and different aggregate flow rates, some nodes may take longer to detect anomalies than others. Additionally, monitors with low sampling rates may miss low packet rate attacks and hence a simple intersection of suspects will fail to detect the attack. So, instead of strict intersection of suspect flows, the detection system of the invention may use a simple voting scheme. A flow is considered an attack flow if a predetermined fraction of the total number of monitors on the flow path report the flow as suspect.

It is to be understood that the detection schemes described above are mere examples and multiple various configurations and extensions are considered to be within the scope of the invention. The distributed nature of the detection scheme affords great flexibility in detecting attack traffic from flows considered to have anomalies at each node.

Returning now to FIG. 5, a final step in the periodic processing is the rehash step 516. At predefined rehash intervals, each monitor resets all of its bin counters and rehashes, i.e., generates a new hash function to alter the packet-to-bin mapping. Rehashing decouples flows from their flow aggregates and assists in isolating anomalous flows of a flagged bin from other flows of a flagged bin. Once the flows are remapped with other flows after rehashing, it is unlikely that legitimate flows from a flagged bin are mapped again to the same bin as the anomalous flow. Setting the bin counters to 0 at the beginning of each rehash interval ensures that the new mapping state is not affected by the old mapping state. Thus, over multiple rehash intervals, anomalous flows will be observed in different bins and may be identified by their flow identifier being common to the respective aggregates assigned to each bin over time.

The decoupling provided by the rehashing has several benefits of note. First, an attack flow may not be detected if the other flows in its bin have enough incoming packets to compensate for the attack flow's lack thereof. Rehashing enables such attack flows to be mapped to other bins that may contain flows with the lower incoming rate thereby increasing the probability of attack detection. Further, rehashing facilitates flow scoring as described above and thereby reduces the number of suspect flows on which to be voted again.

Figure 8:
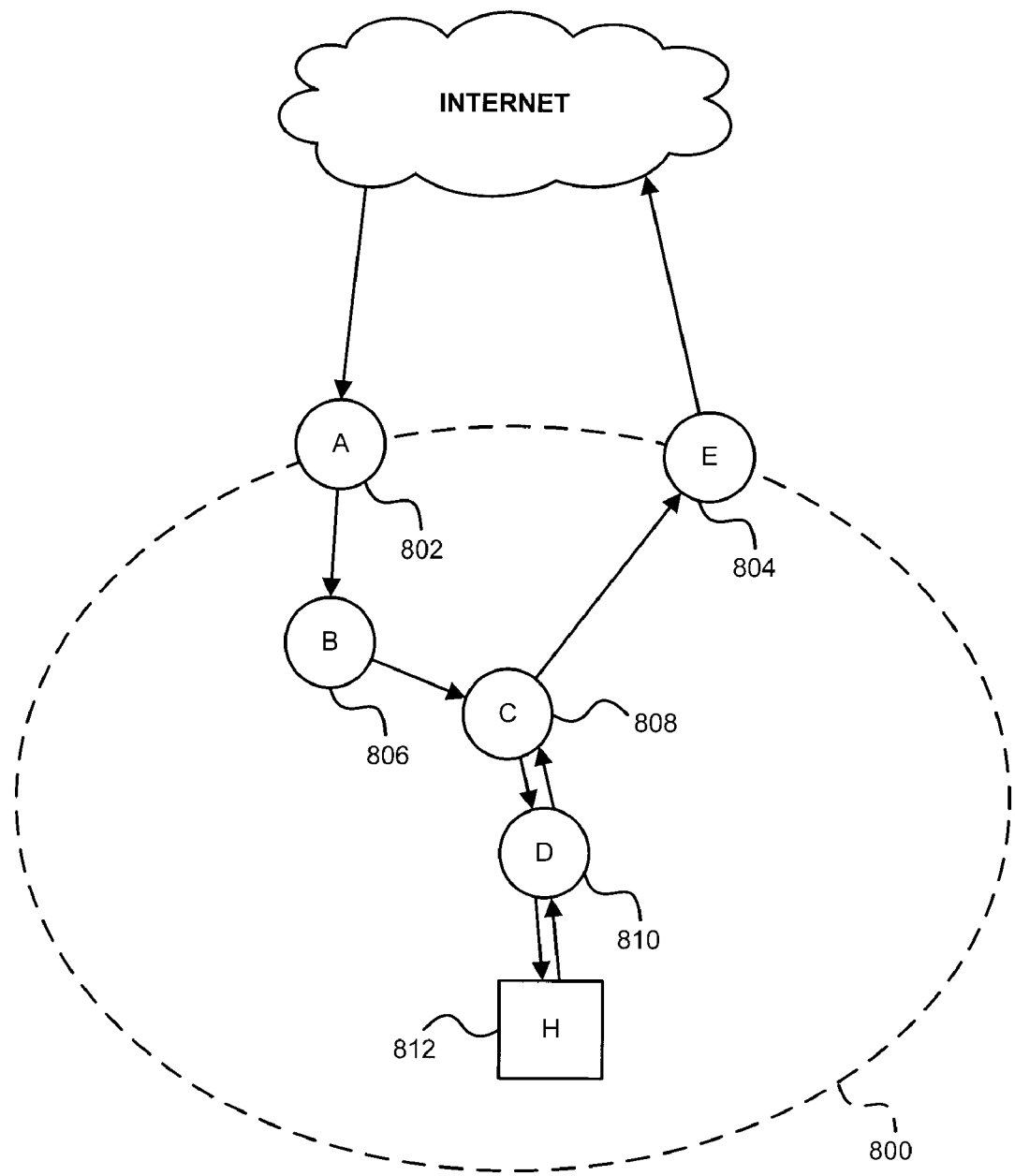
FIG. 8 is a block diagram illustrating asymmetric traffic flow in a multi-gateway stub network.

Referring now to FIG. 8, there is shown an autonomous system 800 with two border routers 802, 804. In autonomous systems with multiple border routers, it is likely that the traffic flows traversing the network will be asymmetric, i.e., their ingress and egress routers are different. From the Figure, it can be observed that mere multiple deployment of a single-gateway solution, such as D-WARD, would be insufficient because the data monitored at each gateway 802, 804 would not necessarily be independent. The detection system would flag the asymmetric flow at each border router 802, 804 as though it were part of an attack. The system of the present invention, having monitors deployed throughout the autonomous system, will properly distinguish attack flows from legitimate flows in that some of the monitored routers on the path between border routers 802, 804 and the end host 812 would be common to the flows in each direction. For example, monitored routers 808, 810 have the flows traversing the routers in each direction and can properly evaluate the incoming-to-outgoing traffic ratio. Thus, the invention correctly distinguishes between legitimate asymmetric flows and attack flows and thus minimizes the number of false attack reports.

In the extreme case, there may be no monitors deployed on asymmetric sub-path of asymmetric flows. For example, in the system depicted in FIG. 8, without monitors 808 and 810, a legitimate asymmetric flow would likely be flagged as an attack by monitor 804. For example, monitors 802 and 806, having sampled incoming packets of the flow, but observing insufficient outgoing packets, may consider the flow to be anomalous. The present invention, however, allows monitor 804 to communicate with monitors 802 and 806 and the missing outgoing traffic of the flows may then be accounted for. The invention can thus correctly determine that the legitimate flow is not anomalous attack traffic.

Figure 9:
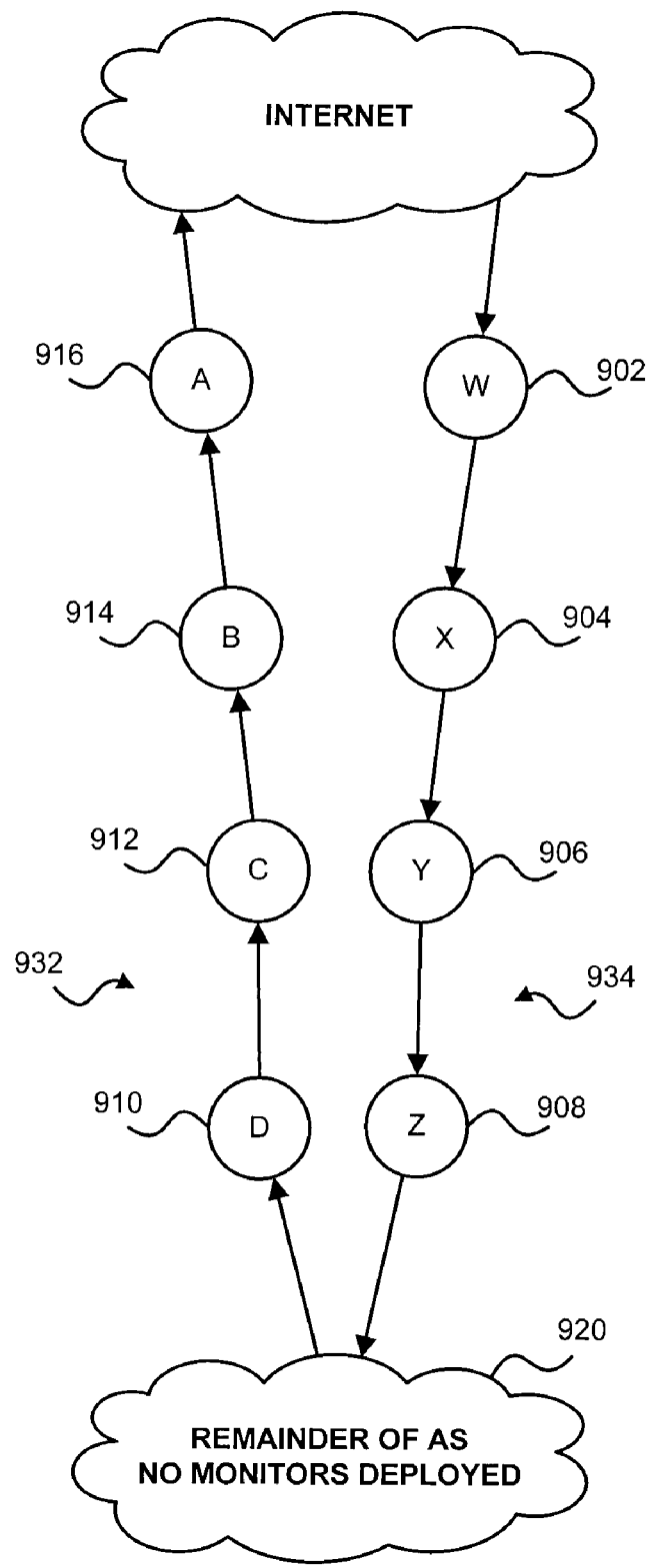
FIG. 9 is a block diagram illustrating detection processes in a multi-gateway stub network in accordance with aspects of the present invention.

Referring now to the network configuration of FIG. 9, there is shown other considerations for deploying the invention in a multi-gateway stub network. Monitors are deployed at routers 902-916 and the network contains other routers, collectively illustrated at 920, that are not monitored. An asymmetric flow's outgoing packets traverse the routers on path 932 and exit the autonomous system at router 916. Incoming packets enter the AS at router 902 and traverse the routers on path 934. Thus, monitors in the AS will only sample outgoing or incoming packets of the asymmetric flows.

Per-packet processing in accordance with the present invention in a multi-gateway network is similar to that of the single gateway. Monitors in the network maintain aggregate counters for incoming and outgoing packets and create flow records when a bin's packet ratio warrants suspicion. However, one difference in the per-packet processing for a multi-gateway network lies in the detection of incoming asymmetric flows. Monitors detect incoming components of asymmetric flows so that the detection system of the present invention may correctly distinguish between attacks and legitimate asymmetric flows. From a particular monitor's perspective, the incoming and outgoing components of an asymmetric flow behave very much like an attack. The difference is that the incoming components will have a large incoming-to-outgoing packet count ratio. Thus, a monitor may detect an incoming asymmetric flow by comparing the bins outgoing-to-incoming packet ratio with the inverse of the attack ratio threshold. In certain embodiments or the invention, the ratio test is implemented through two threshold ratios as opposed to one: $R_{out}$, the overflow threshold and $R_{in}$, the underflow threshold. $R_{out}$ in certain embodiments, is the same as R, i.e., greater than or equal to 2 and $R_{in}$ is its inverse, i.e., less than or equal to one half. Every time a monitor processes a sampled packet, it compares the corresponding bins packet ratio against $R_{out}$ and $R_{in}$. If the ratio is greater than $R_{out}$ or less than $R_{in}$ the bin is flagged accordingly.

A second difference in the per-packet processing for a multi-gateway network is in the flow recording. A bin is flagged if its packet ratio is greater than $R_{out}$ or less than $R_{in}$. In multi-gateway networks, embodiments of the monitor create a record for an incoming packet's flow if the bin corresponding to the incoming packet is flagged. Thus, in addition to outgoing suspect flows, records are created for incoming suspect flows, also. The monitor maintains also a count of the sampled packets for outgoing flows. The flow scoring procedure estimates the flows outgoing packet rate using the counts and uses the estimate to minimize the number of false positives.

In the single gateway network embodiments described above, the monitor closest to the border router consolidates the messages from other monitors. There may be multiple such monitors in a multiple gateway network and thus, any such monitor will serve as the rendezvous node for each flow in the network. A single rendezvous node may suffice for networks with few asymmetric flows, while multiple rendezvous nodes may be used for networks that have a significant number of asymmetric flows. A suitable application of a distributed hash function may be used to map flows using the external IP address, for example, to one of the rendezvous nodes. To simplify the descriptions that follow, the invention will be described below in terms of a single rendezvous node.

Each monitor delivers to the rendezvous node its outgoing and incoming suspects gathered during the rehash interval. For outgoing suspects, the monitor also reports to the rendezvous node the estimated packet rates of the outgoing suspects. In certain embodiments of the invention, packet rates at a monitor are estimated by normalizing the count of outgoing packets of a suspect flow during the preceding rehash interval by the monitor sampling rate and length of the corresponding rehash interval.

The rendezvous node matches outgoing suspect flows to corresponding incoming suspects. If an outgoing suspect has a corresponding incoming suspect, it is deemed a legitimate flow. Of course, this will not capture all legitimate flows, so the rendezvous node must conduct other processing described in paragraphs that follow.

False positives triggered by asymmetric flows occur for two reasons in multiple gateway networks. To demonstrate, reference is drawn to FIG. 10A which depicts counter states at monitors of the autonomous system depicted FIG. 9. In the example, flow 1 is asymmetric with outgoing traffic on path 932 and incoming traffic on path 934. The packet rate for all flows is 10 packets per second in the incoming direction and 10 packets per second on the outgoing direction. It is assumed that the attack threshold is 2. The traffic of flow 1 on path 932 is flagged as an outgoing suspect. However, since there are also symmetric flows on path 934, the incoming portion of flow 1's traffic is masked. That is, the bin corresponding to flow 1 for path 934 has a ratio of ⅔, but $R_{in}$ is ½. Thus, since the outgoing-to-incoming ration for the flow's bin remains above $R_{in}$, the flow will not be reported at the rendezvous node as an incoming suspect. A rendezvous node using simple matching of outgoing and incoming suspects would incorrectly classify flow 1 and a false positive is reported.

Figure 10A:
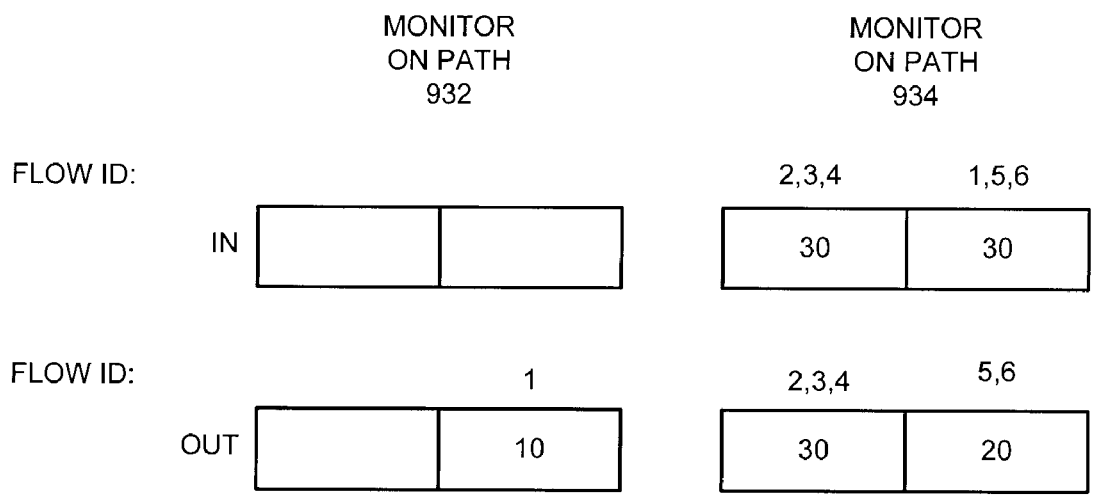
FIGS. 10A-10B are tables illustrating false positive detection of network attacks in asymmetric flows of traffic.
Figure 10B:
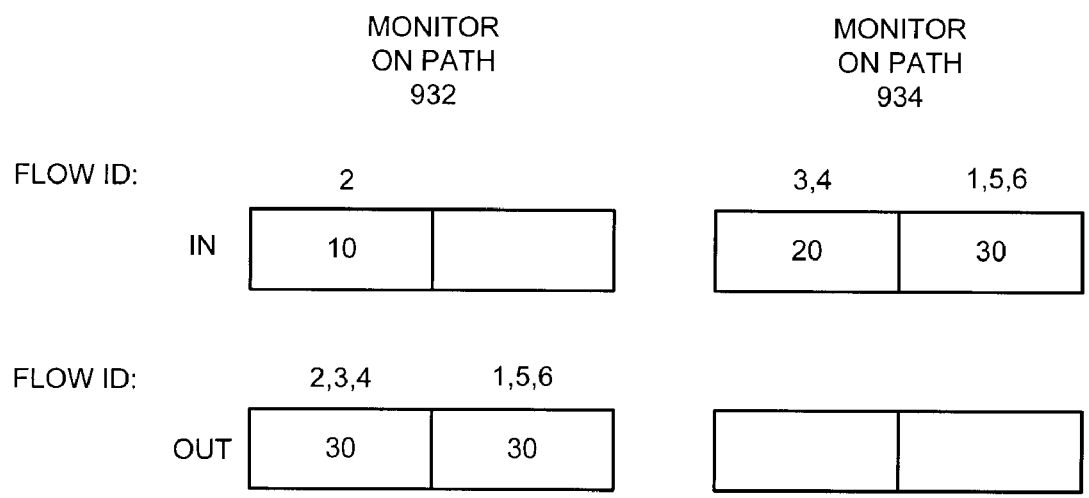

In FIG. 10B, another source for false positives is depicted. In the case illustrated, flow 2 has a symmetric flow on path 932 aggregated with asymmetric flows on path 932. The bin on path 932 will overflow and although there is a corresponding underflowing bin for path 934, flow 2 is not mapped thereto. Thus, again, a simple matching of outgoing to incoming suspects will yield a false positive. In short, false positives arise because some flows mask portions of other flows asymmetric traffic.

In FIG. 10A, if flow 1 has a higher packet rate than the sum of the rates of flows 5 and 6, then flow 1 may have been masked. Similarly, in FIG. 10B, if flow 2 has a packet rate that is greater than the sum of rates 3 and 4, it could not have been flagged incorrectly. Thus, certain embodiments of the present invention use a heuristic to determine if a flow is being masked, and hence may be a false positive, by checking its flow rate to determine if it is less than the expected sum of the other flow rates in its bin. The expected sum of other flow rates in a bin is set as the score threshold at the monitor.

If a flow is masked, that is, has a flow rate less than the score threshold, the detection system of the present invention will not classify the flow as an attack, thereby reducing the incidences of false positive reports. The penalty paid for this approach is that attacks with less than the score threshold will not be reported and increase the false negative rate.

A monitor's score threshold may be proportional to the average number of flows in its bin and the average flow rate of its flows. In certain embodiments, for simplicity, the invention may use a single value for the score threshold for all flows and monitors. In such an event, the score threshold used will be the maximum of the score thresholds at individual monitors. This unified score threshold, σ, is defined as follows:

$$\frac{avg \text{ flowrate} \cdot (\text{\# flows per bin})}{2 \cdot R_{in}}$$

If the asymmetric traffic rate in the network is ascertained by secondary means, σ may be set lower, reducing the occurrence of false negatives.

A rendezvous node updates the scores for outgoing suspect flows using the estimated packet rates for the flows reported by the monitors. For an outgoing suspect flow f, let $M_f$ denote the list of monitors on its path and $N_m[f]$ denotes the estimate packet rate of f as reported by $m \in M_f$. Using this notation, certain embodiments of the invention compute the score as follows:

$$\Delta \text{score}[f] = \frac{\sum_{m \in M_f} N_m[f]}{|M_f|}$$

$$\text{score}[f] += \begin{cases} \Delta \text{score}[f], & \Delta \text{score}[f] > \sigma \\ -1, & \text{otherwise} \end{cases}$$

The Δscore of f is thus the average of its estimated packet rate reported by the monitors on its path. Outgoing suspect f is deleted from the suspect list if its score reaches 0, if there is a corresponding incoming suspect or if its Δscore for a rehash interval is 0. The Δscore for f will be 0 for a rehash interval only if it is not suspected by any of the monitors during that rehash interval. In such instances, short-lived or weak flows will be deleted by the rendezvous node until again flagged by the monitors.

If the average flow rate in the network is high, it is possible that the score threshold σ may be high enough to miss detection of weak low rate attacks. However, lowering the score threshold may result in a greater occurrence of false positives. False positives arise in some cases when the outgoing component of an asymmetric flow is flagged, but the corresponding incoming component is not. Using a key observation that flow rates in a network may vary by several orders of magnitude, the likelihood for an incoming component to be mapped to an aggregate consisting of a low rate outgoing traffic increases when subjected to a greater number rehash intervals. The legitimate incoming component will then be flagged as an incoming suspect to match the outgoing suspect thereby avoiding the false positive indication. In this embodiment, the score threshold value is reduced, for example, by half, thereby trading off detection time for improved detection accuracy.

Outgoing suspects are observed by the rendezvous node for a minimum number of rehash intervals before flows are reported as attacks. During a rehash interval, the rendezvous node considers each message corresponding to outgoing suspects as a positive vote for the respective outgoing suspects. After the minimum number, say z, of rehash intervals, if an outgoing suspect receives at least z×k positive votes out a possible total of z×n, where n is the total number of monitors and k is a number of votes described in the voting procedure above, its score is more than the score threshold σ, and does not have a corresponding incoming suspect, then it is confirmed as an attack. Otherwise it is removed from the suspect list.

Attack flows may avoid detection by flooding the stub AS with a large number of packets having random source addresses from outside the AS. A more efficient mechanism, however, is for a host outside the AS to send mask packets, which are packets destined to the attacking host in the AS and have the source address spoofed as the victim's address. In essence, the external attacker would be providing the ACKs that the victim is unable to deliver to emulate legitimate traffic. If the rate of mask packets is the same as that of attack packets, the bin ratios corresponding to the attack will not overflow and the attack will not be detected. In certain embodiments of the invention, all stub domain networks implement egress filtering to prevent this loophole from being exploited. When so embodied, only hosts that are in the same AS as the victim can participate in masking, which attackers are unlikely to do as it would reveal their identity.

The distributed nature of the invention permits tracing back the traffic to the sub-tree that contains the attacking host. The smallest such sub-tree will be rooted at the monitor that (a) is closest to the attack host and that (b) detects the attack by the attacker, which means that the monitor lies on the attack path between the attacker and the network gateway. The present invention is intended for deployment at autonomous systems that are potentially a source of an attack, so the task of tracing back to an offending node or subnet is easily implemented. Since each machine involved in performing the traceback is in the same AS, they are presumably trusted and can be suitably configured. To perform the traceback, embodiments of the present invention communicate traceback information between nodes using the overlay network.

Figure 11:
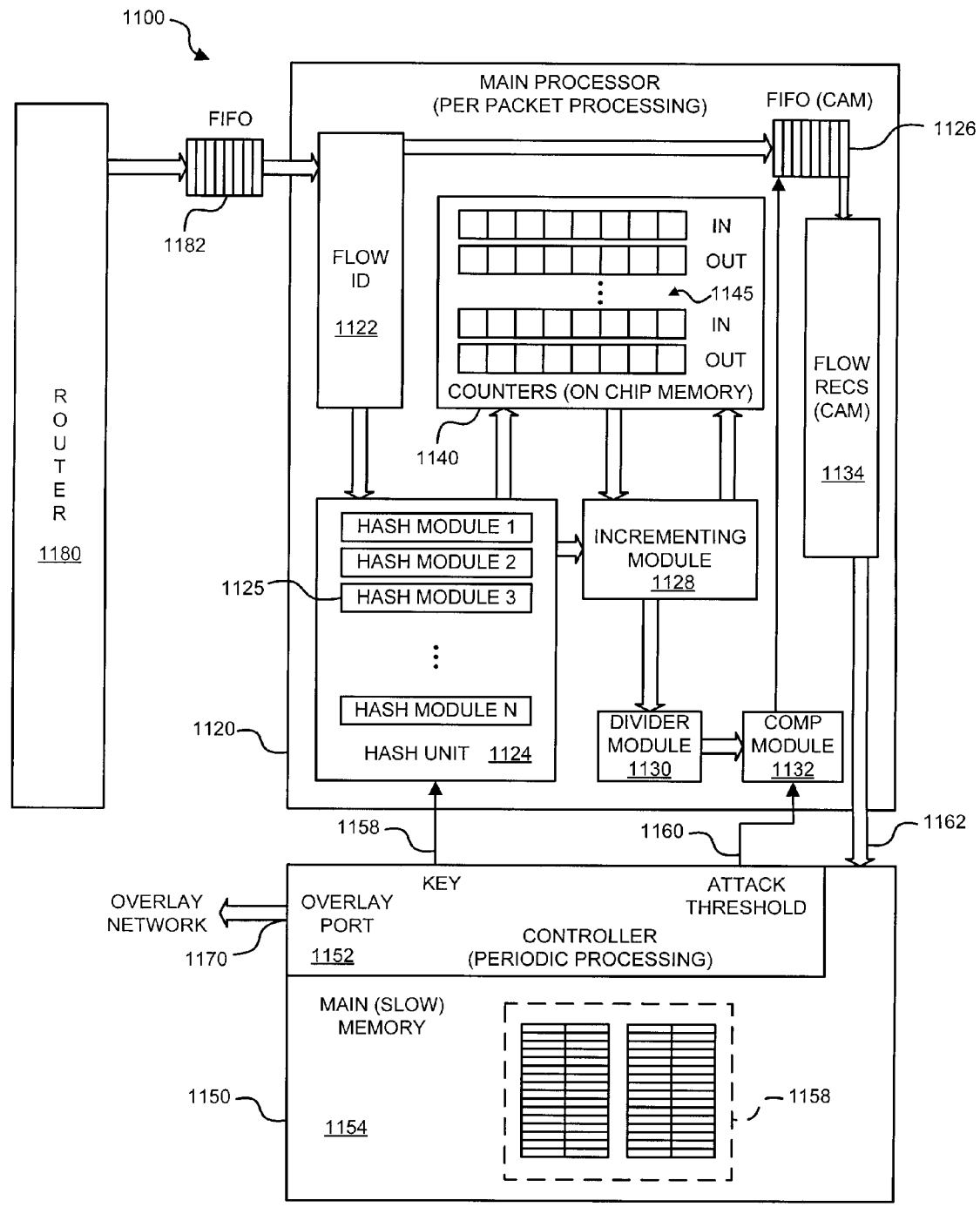
FIG. 11 is a schematic block diagram of an exemplary hardware configuration for carrying out aspects of monitoring functions of the present invention.

An exemplary hardware configuration suitable for carrying out aspects of monitoring in accordance with the present invention is illustrated in FIG. 11. The system includes a router 1180 and a monitor 1100. The monitor 100 includes a fast memory unit 1120 for executing per-packet processing and a slow memory unit 1150 for executing periodic processing. The fast memory unit 1120 reads a packet from a FIFO queue 1182 at the router interface. The flow identifier unit 1122 extracts from the packet the packet direction, i.e., entering or leaving the AS, and the flow identifier from the packet header. The information is then forwarded to both the FIFO 1126 and to the hash unit 1124. In certain embodiments, the hash unit 1124 has multiple hash modules, such as that indicated at 1125, to compute hash values in parallel using the flow identifier. The hash result is used to access the corresponding bin counters 1145 configured in the on-chip memory 1140 during the hash interval. The bin counter values and the packet directions are forwarded to the increment module 1128 where the corresponding counter, i.e., incoming or outgoing, would be modified based on the packet direction and the result would be written to the on-chip memory 1140. The on-chip memory 1140 may be fabricated in 1T-SRAM or 3T-iRAM to achieve a large amount of storage space. The counter values are also forwarded to the division module 1130 where the bin ratio is computed and forwarded to compare module 1132. The compare module 1132 determines if the aggregate is suspicious, i.e., if the ratio is outside the range $[R_{in}, R_{out}]$ and then forward the result of the ratios comparison to the FIFO 1126. If the bin is suspicious, the FIFO forwards the corresponding packet ID and the packet's direction to the flow records memory 1134. If the bin is not suspicious, the FIFO would delete the corresponding entry from the queue. In certain embodiments of the invention, the flow records memory 1134 is implemented as content-addressable memory (CAM) to avoid multiple instances of the same flow record being created. Since the FIFO 1126 provides data directly to the flow records memory 1134, it too may be implemented in CAM.

Periodically, the CAM flow records unit 1134 flushes its contents to main memory 1154 in slow memory processing unit 1150, as indicated at 1156. The slow memory processing unit 1150 includes a controller 1152 which performs the periodic processing. At the end of every rehash interval, the control processor 1152 writes a new random key to the hash monitor 1124 via signal port 1158 and the key is stored in the hash unit 1124. In certain embodiments of the invention, the control processor computes an attack threshold dynamically and provides it to the compare module 1132 via port 1160. The controller 1152 may also include an overlay communication port 1170 for communicating information to other monitor's in the overlay network described above.

The embodiments of the invention above have been described in terms of detecting bandwidth attacks against single hosts to introduce first principles of the present inventive concept. However, attacks also target multiple addresses of a sub-network so as to congest the access link to that subnet. Such attacks are referred to herein as subnet attacks. Typically, access links to subnets have higher bandwidth than access links to single hosts. Hence, the aggregate attack rate of a subnet attack may be much greater than the attack rate in a host attack. However, a subnet generally includes numerous addresses and packets of a subnet attack may be destined to any of those addresses in the subnet. Thus, traffic to individual addresses in the subnet may be very sparse.

Figure 12A:
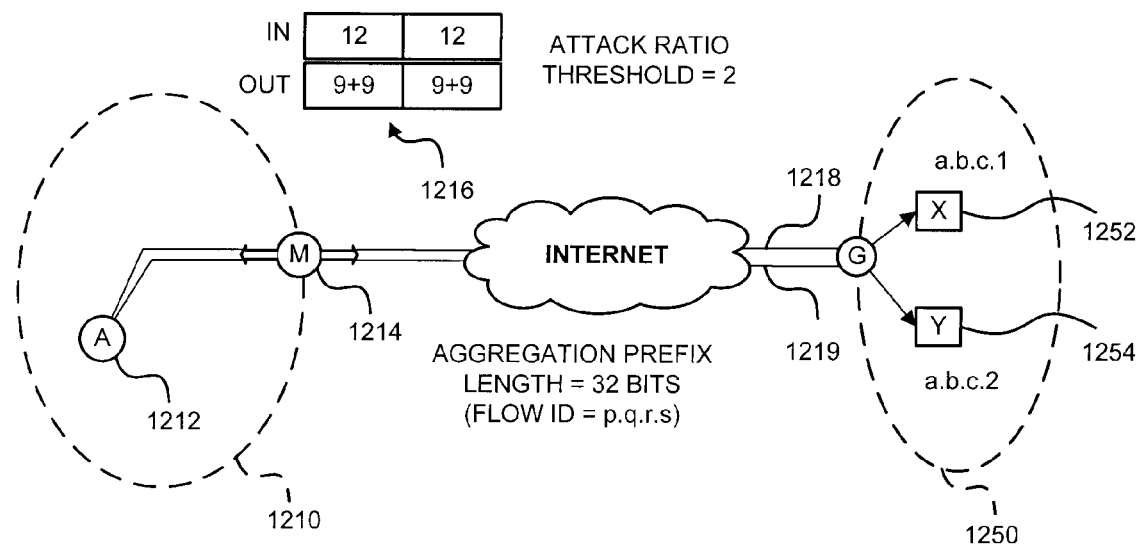
FIGS. 12A-12C are diagrams illustrating certain requirements of detection of subnet attacks by the present invention.

An example of a missed subnet attack scenario is illustrated in FIG. 12A. In the Figure, the attacking AS 1210 is monitored at its border through counters 1216 maintained by monitor 1214. The attacking AS includes an attacker 1212, which, although illustrated as a single node, may actually be multiple nodes in the AS 1210. The attacker 1212 transmits attacking flows 1218, 1219 to hosts 1252, 1254 in the attacked subnet 1250. If the two flows 1218, 1219 have very low flow rates and the monitor 1214 maps those flows 1218, 1219 to different aggregates by way of the choice of flow ID, the counters 1216 may not generate the counts necessary to detect the subnet attack.

Figure 12B:
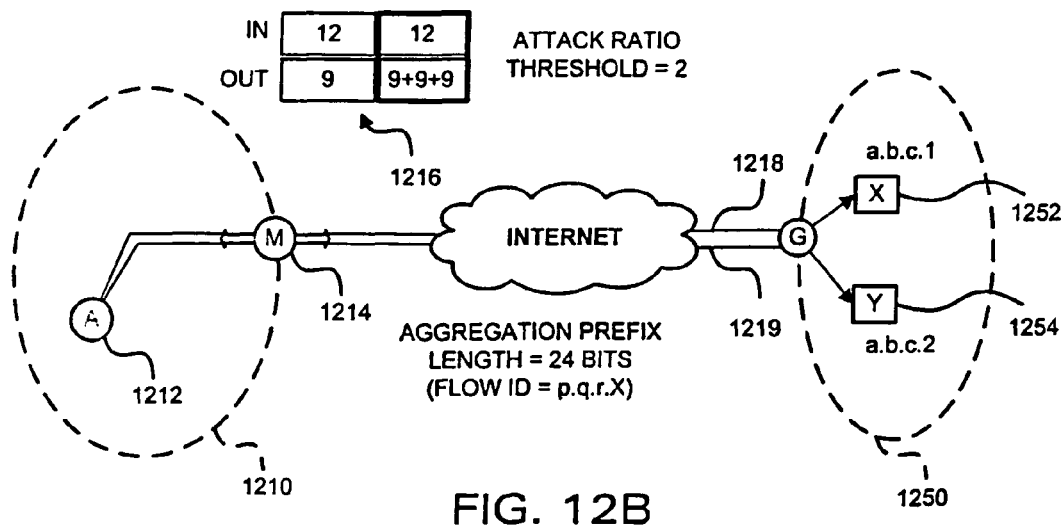

One possible solution to the shortcoming described above is to use address prefixes to map flows to the corresponding bins, recognizing that a flow is a set of traffic streams to the same external address. Such a system is illustrated in FIG. 12B where the detection scheme uses 24 bit prefixes to map flows to bins. As is shown at 1216, the flows 1218, 1219 have been mapped to the same bin and the attack is thus detected.

Figure 12C:
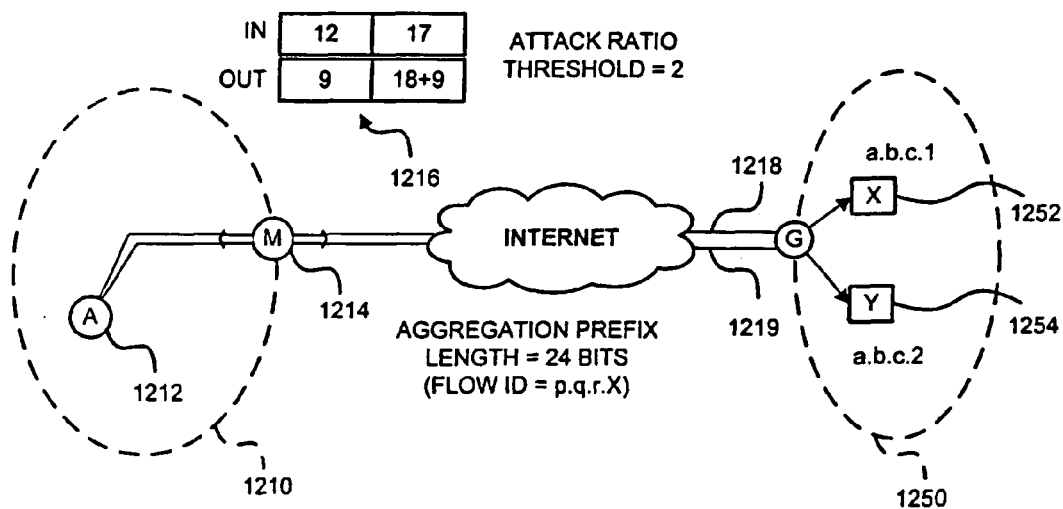

The problem with this solution is two fold. First, it is difficult to determine the prefix length and prefix range to use for the mapping because subnets in generally are not of a fixed size and the address ranges for subnets may not be contiguous. Second, a monitored prefix may correspond to hosts which are not under attack, but may be the destination of legitimate flows having large flow rates. The flows directed to these hosts may mask the attack flows to the victim host in the subnet and the attack will be missed. This scenario is illustrated in FIG. 12C.

The present invention extends the principles of the invention to implement procedures at an overlay node so as to detect subnet attacks. In certain embodiments, such as that described below, the subnet attack detection scheme is executed by the overlay node that is deployed at the AS gateway. However, other implementations are possible and well within the scope of the present invention, examples of which such are given in the paragraphs that follow.

In accordance with aspects of the present invention, a set of flows F is mapped to a counter. For each sampled packet of flow iεF, the counter is incremented by one if the packet is outgoing and decremented a decrementing value, $\kappa_i$, if the packet is incoming. In certain embodiments of the invention, the decrementing value, $\kappa_i$, is set to the outgoing-to-incoming packet ratio of flow i. When the flow terminates, the net increment to the counter due to flow i's outgoing and incoming packets will be zero. This is true for all legitimate flows in the set of flows F. Certain embodiments of the invention establish that legitimate flows must have an outgoing-to-incoming packet ratio of at most 3 and bandwidth attacks have a outgoing-to-incoming packet ratio much larger than 3. If all $\kappa_i$'s are thus upper-bounded by 3, an incoming packet can decrement the counter by at most 3. If flow jεF is an attack flow, i.e., $\kappa_j$ is greater than 3, updating the counter in accordance with j's outgoing and incoming packets and will result in a net increase in the packet count. Thus, a net increment to a counter's value over time indicates the presence of an attack flow along the set of flows mapped to that counter.

Referring to FIG. 13, there is demonstrated an exemplary per-packet update and attack flow detection procedure for a counter consistent with the present invention. In the Figure, flow 1 has a flow ratio of 2 and flow 2, an attack flow, has a flow ratio of 4. Packets are sampled from one of the two flows in accordance with the sequence numbers indicated in the Figure. Each packet has a packet direction associated therewith and such is indicated in the packet direction row. In a first case where κ is unbounded, packet counter updates do not result in net increments at the counter, because the counter was decremented by a value that tracks the flow's traffic. In a second case where κ is upper-bounded at 3, increments due to flow 2's outgoing packets will be more than the decrements due to incoming packets and the counter will have net increment over time to indicate the presence of an attack.

To implement the benefits of this inventive concept, the invention implements a data structure that aggregates flows by the subnets to which they are destined. Such a data structure should be size-limited so as to fit in the fast memory of the monitors. The counters in the data structures preferably not only indicate the presence of an attack, but also identify the attack victim.

Further, since a flow ratio may vary with time due to variations in the mix of applications and traffic and because of changes in the network state, accurately estimating the outgoing-to-incoming packet ratio is difficult. Single estimation of flow ratios yield little useful results. Thus, certain embodiments of the present invention, instead of estimating flow ratios, implement a single κ value set as the maximum flow ratio for legitimate flows. A data structure is constructed in accordance with a packet update scheme that decrements a flow's incoming packet count by a value that at most equals the increments corresponding to the flows outgoing packets.

In accordance with embodiments of the present invention, a flow may be mapped to multiple flow aggregates and a counter is associated with each flow aggregate. The mapping of a flow to aggregates is determined by the IP address of the flows destination, i.e., the flow identifier, as well as a hash of the flow identifier. A set of counters may be represented by a two dimensional table of counters, as will be described further below. If a flow's sampled packet is outgoing, all counters corresponding to the flow are incremented by one. If the packet is incoming, all of the flow's counters are decremented by a positive value κ, as long as all the counters are greater than κ. The decrement policy is that net increments of counters due to packets of a legitimate flow are almost zero. An attack flow, because of its high outgoing-to-incoming packet ratio, will increment is counters more than it decrements the counters. Hence, an attack flows counters will have significantly larger values than other counters. Ongoing attacks can be detected by periodically processing the counters and identifying those counters that have values significantly larger than other counters. The flow to counter mapping allows identification of the victim's subnet in a straightforward manner.

In certain embodiments of the invention, two equally sized two-dimensional tables of counters are used to map a flow. The flow is mapped to a counter in each of the columns of both tables. The flows external IP address, or flow identifier, is used to index the counters in one table and a hash of the identifier is used to index counters in the other table. Accordingly, the two tables are referred to as an IP-indexed table and a hash-indexed table, respectively.

Figure 14:
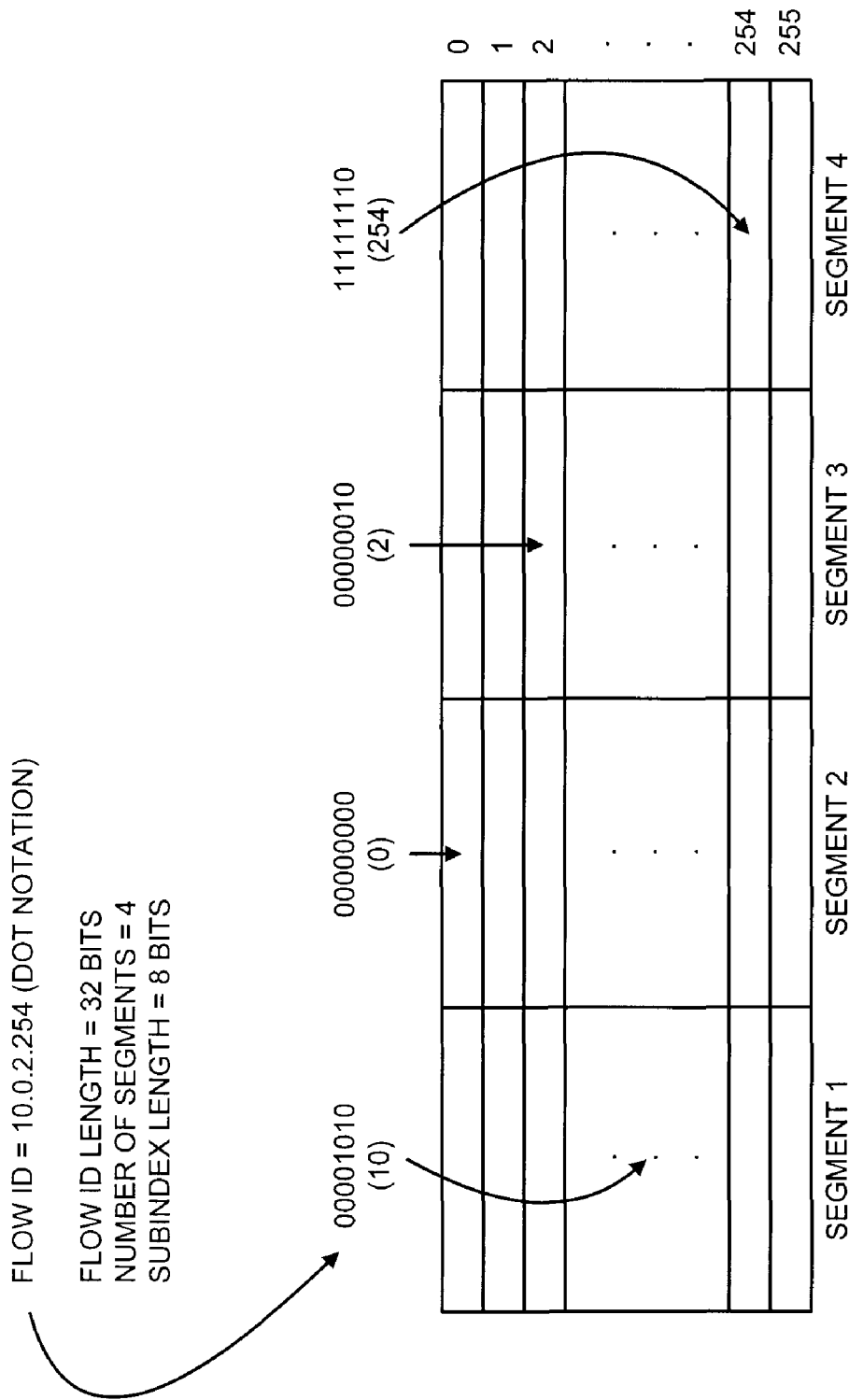
FIG. 14 is a diagram of an exemplary IP indexed mapping table in accordance with aspects of the present invention.

Mapping of a flow to the IP-indexed table's counters using the flow identifier is illustrated in FIG. 14. The mapping of a flow to the hash index table occurs in the same manner as for the IP index table. However, a hash of the flow identifier, computed using a hash function associated with the hash-indexed table, is used to map the flow to the hash-indexed table instead of the flow identifier.

For purposes of description, it will be assumed that flow identifiers are p bits in length and the table, be it the IP-indexed table or the hash-indexed table, has c columns. If p is a multiple of c, the identifier may be split into c non-overlapping parts each of equal length, referred to as segments, as shown in FIG. 14. It is to be noted that by "non-overlapping", it is implied that none of the bits of the identifier are mapped to more than one segment. Each segment corresponds to that column of the table as determined by its position in the flow identifier. Thus, the first segment corresponds to the first or left most column of the table, in the exemplary case of FIG. 14 the numeral 10, the second segment of the flow identifier corresponds to the second column of the table, the numeral 0 in the exemplary case of FIG. 14, and so on. As is shown in the Figure, the value of a segment is used to index the counters in the corresponding column. If p is not a multiple of c, then (p mod c) least significant bits of the identifier are ignored and the rest of the index is split as described above. In certain embodiments of the invention, the table is byte-aligned to simplify access to the table's elements. However, byte-aligning the table is not necessary to implement the invention.

A hash-indexed table has associated therewith a static hash function. The hash function takes a full flow identifier of a flow, i.e., 32 bits for version 4 of the IP suite (IPv4), as input and generates a hash value of equal size, i.e., 32 bits. If the hash function is uniformly random, the probability that two flow identifiers are mapped by the hash function to the same hash value will be $$\frac{1}{|\text{flow } ID|}, (2^{-32}$$

for IPv4). As stated above, the flow is mapped to the hash-indexed table in the same manner as the IP-indexed table, with the exception that the hash of the flow identifier is used for the mapping.

The flow mapping in the IP-indexed table causes flow identifiers with the same prefixes to map to the same counters in the left columns of the IP-indexed table. For example, for a 4-column IP-indexed table, flows to hosts 10.0.2.11 and 10.0.2.187 will be mapped to the same counters in the first 3 columns of the IP-indexed table. In contrast, the mapping of flows into the hash-indexed table through a hash function results in the same prefixes being mapped to different counters with high probability. Thus, flows of a subnet attack are mapped to same counters in the left columns of the IP-indexed table and with high probability to different counters in the hash-indexed table. As will be described below, mapping in the IP-indexed table assists the detection of attacks and mapping in the hash-indexed table reduces false positives and false negatives.

When a packet is sampled, the corresponding flow is mapped to the counters in both tables, as described above. For an outgoing sampled packet, all corresponding counters are incremented by one. If the packet is incoming, the corresponding counters are decremented by a positive value κ, if all of these counters are at least κ. The value for κ may be set to the maximum acceptable ratio of outgoing-to-incoming packet ratios for legitimate flows in the network. In certain embodiments, it is assumed that the legitimate flow may have this ratio up to a value of 3 and, hence, the value of 3 is selected for κ.

The decrementing scheme of the present invention is consistent with the concept that attacks can be detected if net increments to counters to which the attacks are mapped are significantly larger than other counters in the tables. Net increments resulting from attack flows should be much larger than any such net increment due to legitimate flows. Also, the counting of traffic of legitimate flows should not cause a net decrement in the counter since legitimate flows aggregated with an attack could then mask the attacks increments with traffic that actually decrements the counter. Thus, decrementing by the value κ for incoming packets as described above ensures that the attacks can be detected with high reliability.

Figure 15:
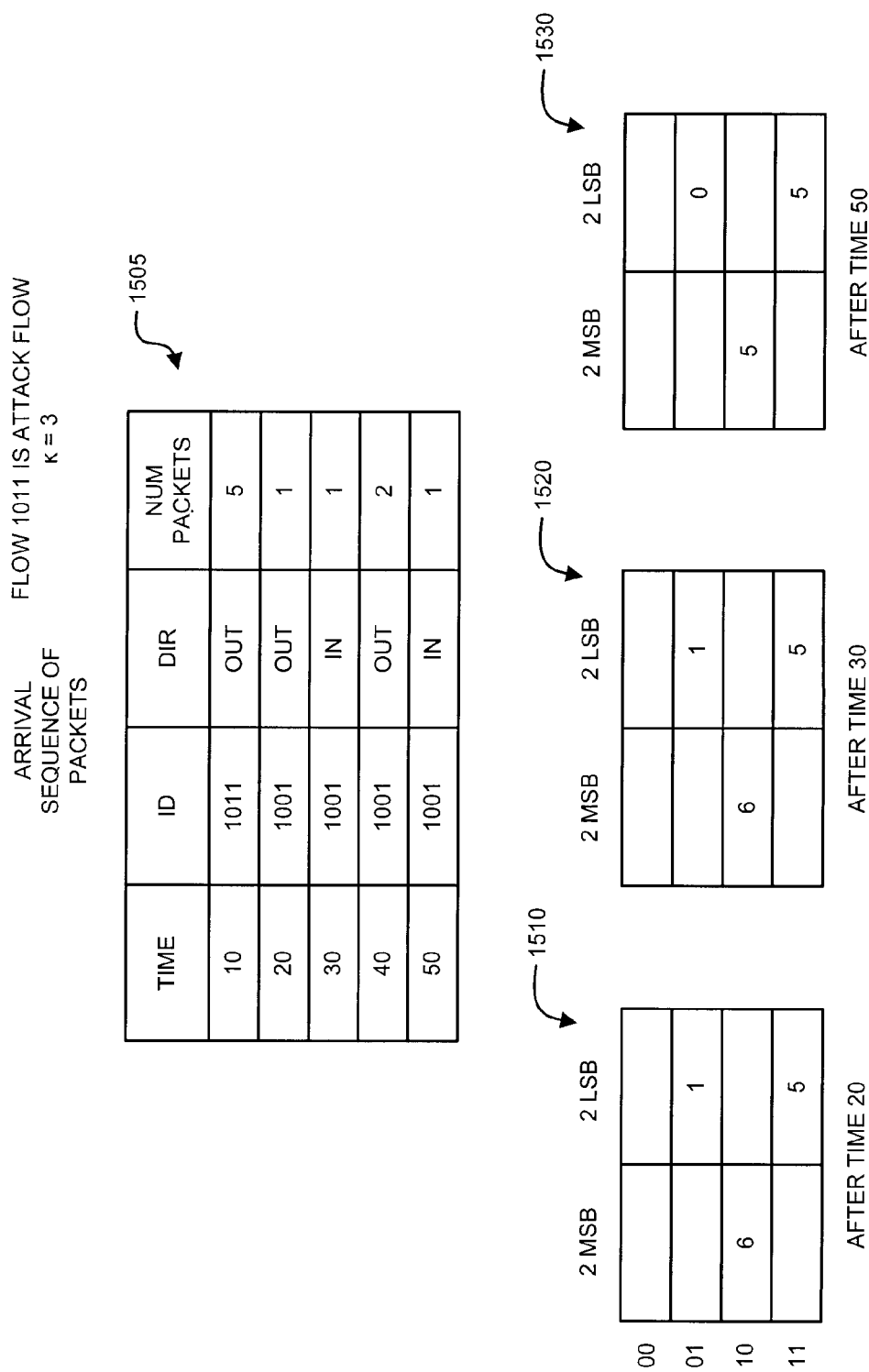
FIG. 15 is a diagram illustrating exemplary counter operation for detecting a subnet attack in accordance with the present invention.

Referring to FIG. 15, a demonstration of the increment/decrement scheme according to the present invention is illustrated. As shown in the Figure, the exemplary flow IDs are 4 bits long, the counter table has 2 columns, as shown at 1510, 1520, 1530 and flow 1011 is an attack flow. The arrival sequence of packets is shown in the table of 1505 and the value of κ is set to 3. At time index 10, the outgoing packets of attack flow 1011 will increase left column counters corresponding to 10 and right column counters corresponding to 11 the value 5, a unit gain for each packet. At time 20, as shown at 1510, flow 1001's outgoing packet will increment the corresponding counters by 1. At time index 30, as shown at 1520, the incoming packet of flow 1001 does not cause a decrement in the corresponding counters because counter 01 in the right hand column is less than the κ of 3. At time 40, this counter is incremented to 3 and at time 50, as shown at 1530, the right column counter, as well as the left column counter corresponding to the number 10 is decremented by 3. At this point in time, the counters corresponding to the attacks have net increments and the other counters are 0. By analyzing the counters, the attacks can be detected.

Figure 16:
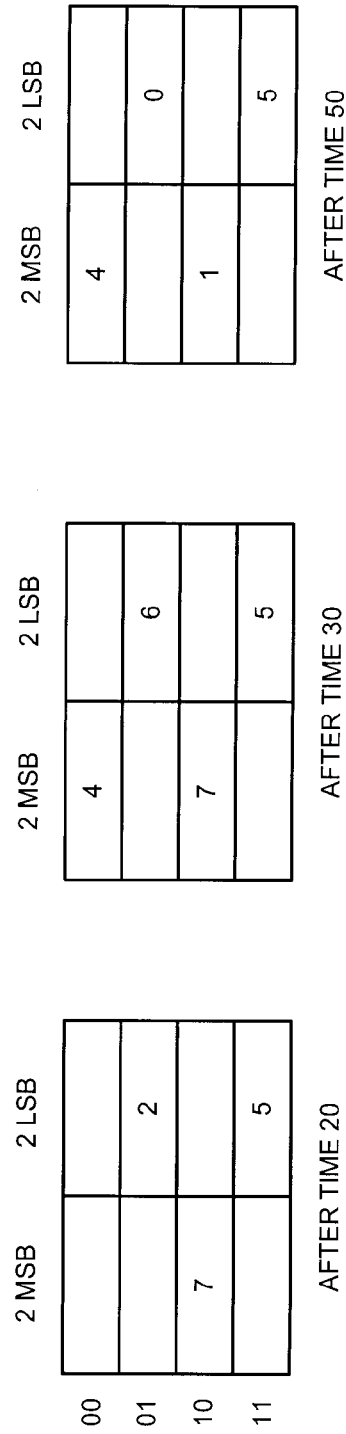
FIG. 16 is a diagram illustrating effects of flow aggregation on the counter operation in accordance with the present invention.

The aggregation of packets may induce mapping packets to fewer rows per column, which cause counter-manipulations that lead to false positives and/or false negatives. This is illustrated in the example of FIG. 16. The arrival of packets occurs in accordance with the sequence depicted at 1605 and, as in the previous example, the flow corresponding to flow ID 1011 is an attack flow. The value for κ is again 3. With the given aggregation and order of packet updates shown at 1605, packets of flow 1001 will decrement the corresponding counters by 6 at time 40 even though it has incremented the counters only by 2. Consequently, the attack signal in the counter corresponding to 10 is masked. Moreover, the counter corresponding to 00 has values significantly larger than other counters in the table. It is clear that, in extreme cases, particular traffic can cause counter updates that suppress attack detection and generate false positives.

The effect of aggregation is dependent upon the size of the table. With more rows, flows are aggregated less and incidences of adversely decremented counters will be fewer, but attacks having very low flow rates may go undetected. If aggregation increases, adverse decrements may also increase, but more false positives and negatives may result.

The use of a hash-indexed table in accordance with the present invention reduces the impact of aggregation in two ways. First, it increases the number of counters to which a flow is mapped to reduce the possibility of adversely decrementing a counter. With more counters and different sets of flows mapped to these counters, the probability of decrementing incorrectly decreases. It is to be understood that the invention is not limited in the number of hash-indexed tables in a particular implementation, however one such table is sufficient in most applications. Secondly, the hash-indexed table prevents an attacker from masking his attack flow with the help of a large legitimate flow to a host in the victim's subnet.

Flows to a subnet, as described above, map to the same set of counters, for example in the left columns of the IP-indexed table. Increments due to flows of a subnet attack are thus highest in counters in the left columns of the IP-indexed table. Periodically, the IP-indexed table is analyzed to detect ongoing bandwidth attacks. The interval between periodic processing should be larger than the roundtrip time (RTT) for most flows in the network. In certain embodiments of the invention, the incoming packet updates compensate the outgoing packet updates at the counters.

Figure 17:
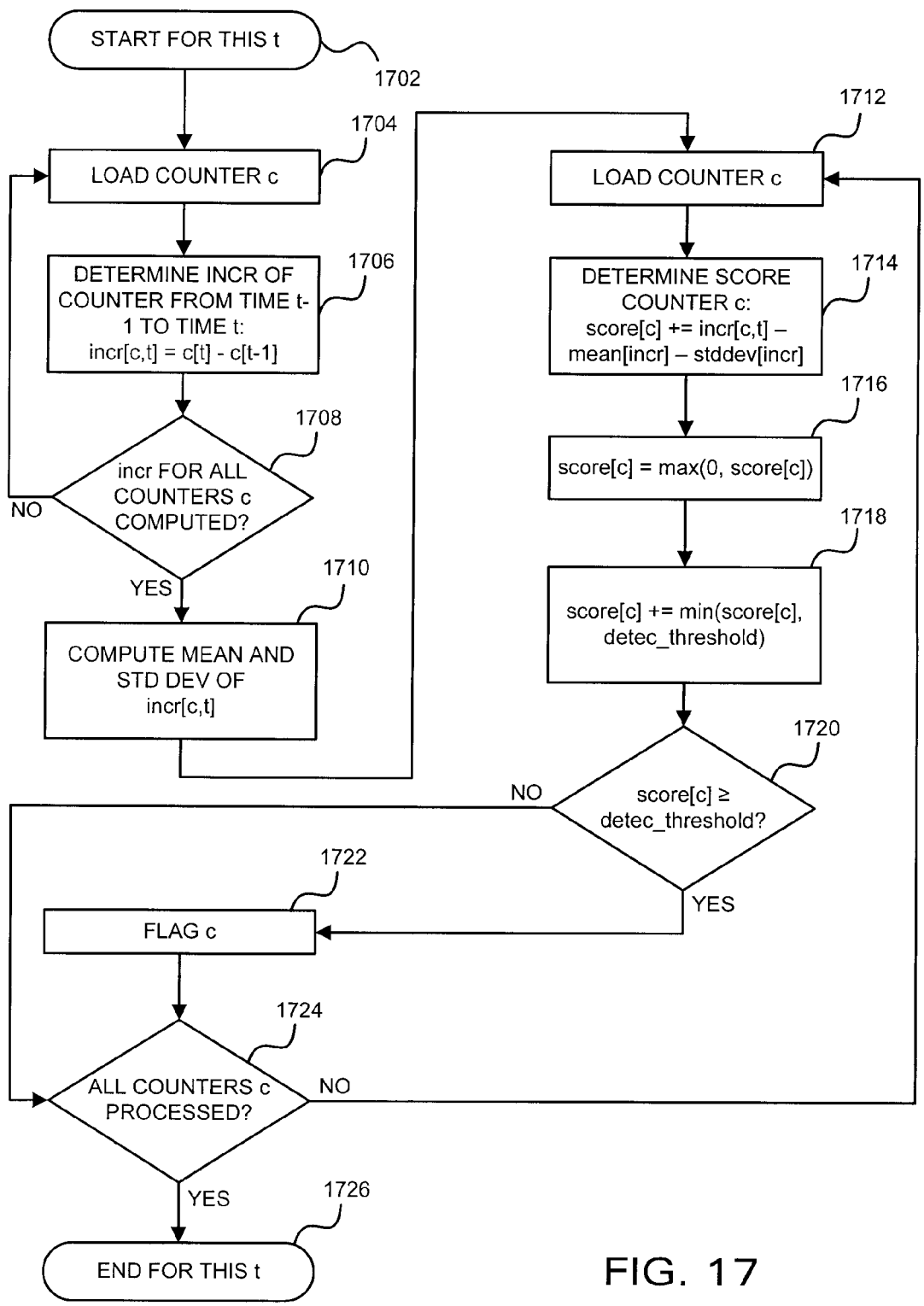
FIG. 17 is a flow diagram of exemplary method steps in carrying out aspects of periodic processing of the present invention.

An exemplary procedure for the periodic processing of certain embodiments of the invention is illustrated in FIG. 17. As is shown in the Figure, for the interval ending at time index t, the procedure is entered at 1702 and a counter c is loaded at block 1704. Flow is transferred to block 1706, where the increment in the counter c from time t−1 to the present time t is determined. At block 1708, it is determined if all the counters c have had their increment values computed. If not, flow is transferred back to block 1704 and the next counter c is loaded. Otherwise, flow is transferred to block 1710, where the mean and standard deviation of all the increment values are computed. Flow is then transferred to block 1712, where again a first counter c is loaded for computation. Flow is transferred to block 1714 where the counter's score is updated. Any previous value of the score is modified by the increment value minus the mean increment value minus the standard deviation of the increment value. Flow is then transferred to blocks 1716 and 1718, where the score for the counter is bounded by 0 and a predetermined detection threshold. At block 1720, it is determined that if the bounded score is greater than or equal to the detection threshold and if it is, that counter is flagged at block 1722 as belonging to an attack flow. If the score is not equal to the detection threshold, it is determined at block 1724 whether all of the counters c have been processed. If not, the next counter is loaded at 1712 and its score is computed. If all counters have been processed as determined at block 1724 the process ends at 1726.

A score is computed over time for each of the counters to detect counters to which attack flows are mapped. Scores are computed using the net increments of counters over the period. In certain embodiments of the invention, the detection threshold is set proportional to the sampling rate. The score may be bounded between 0 and the detection threshold to minimize the effect of an old state on the detection process.

The rationale behind the score computation embodiment previously described is as follows. The net increment of a counter may be due to flow aggregation or because an attack flow is mapped to the counter. The net increment of a counter during a period is assumed to be a random variable and the number of attacks is assumed to be very small compared to the number of rows in the table. Since increments due to an attack flow will be larger than those due to flow aggregation, increments that correspond to attack flows may be treated as statistical outliers. To determine these outliers, the average and standard deviation of the net increment is computed and their sum is used as the baseline against which the net increment due to aggregation can be measured. Increments of counters above the baseline are considered the outliers.

It is to be noted that counters to which attacks are mapped will have increments during the entire duration of the attack, while other counters may have net increments for a few periods. The score of a counter is the net increment of the counter above the baseline. Hence, the score for a counter to which an attack is mapped will increase over time and scores for other counters will be at approximately 0 most of the time, although may peak at a low value briefly.

Columns in the IP-indexed table are mapped to different portions of the flow identifier. If the sampled traffic contains only one subnet attack, only one counter from different columns of the table will be flagged and the prefix of the subnet under attack can be constructed by combining the indexes of the flagged counters. If the sampled traffic has more than one ongoing attack at a time, the combinations required to determine the victim's subnet prefixes increases exponentially. For example, if the IP-indexed table has two columns and there are three attacks simultaneously in the network, then three counters will be flagged in each of the two columns, giving a maximum of nine possible subnet victims. With n columns in the table and attack flows directed to m victims in the target subnet, there may be up to $m^n$ possible combinations. To address this problem, certain embodiments of the invention implement a slightly different mapping scheme described below.

Figure 18:
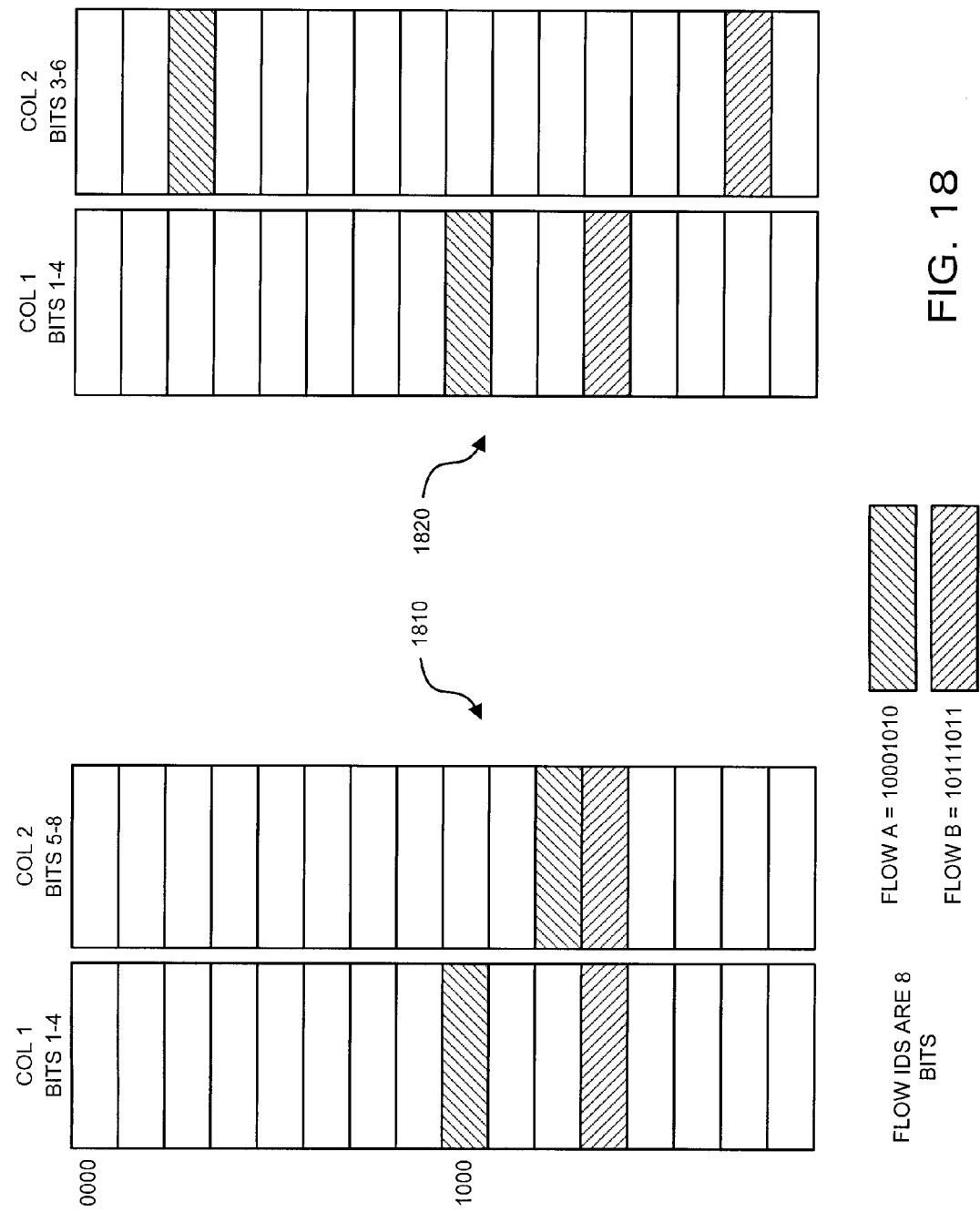
FIG. 18 is a diagram illustrating exemplary enhancements to flow mapping in accordance with embodiments of the present invention.

In the previously described embodiments, the mapping scheme assumes that adjacent segments do not overlap. The combinations resulting from multiple attacks on a network may be statistically reduced if adjacent segments in the table are allowed to overlap, as is shown in FIG. 18. In the embodiment illustrated in the Figure, the IP addresses are 8 bits long and the IP-indexed table has 2 columns. Flow A having flow ID 10001010 and flow B having flow ID 10111011 are attack flows and the detection procedure flags the counters to which these two flows are mapped. In the table 1820 the segments do not overlap and in the table 1820 the segments overlap in bit positions 3 and 4. The flagged counters are shown by the corresponding shading in the tables.

Without overlap, the detection system identifies four combinations in table 1810 corresponding to possible victim subnets, i.e., (1000 1010), (1000 1011), (1011 1010) and (1011 1011). With the overlap in table 1820, flagged counter 1000 of column 1 will only map to counters 0000, 0001, 0010 and 0011 of column 2 of the table, since the overlapping digits must be equal. Of these four counters, only 0010 is flagged. Hence, the only possible combination for the victim subnet prefix corresponding to flow A will be 100010. Similarly, for flow B, the flagged counter 1011 in column 1 will match only with flagged counter 1110 in column 2 in table 1820 and the prefix that can be constructed will be 101110. An additional column in table 1820 that corresponds to bits 5-8 would enable determining the victim prefix as completely without any ambiguity. In general, in accordance with the invention, with d columns and overlap of y bits, a table can reduce the possible combinations for constructing prefixes by $2^{-y(n-1)}$.

The detection scheme on subnet attacks previously described is deployable in networks in which all legitimate flows are assumed symmetric. If the network has legitimate asymmetric flows, such as in the multi-gateway systems previously described, those flows may also be flagged as attacks. For example, consider a network having 2 gateways G1 and G2, where a first flow 00 is a symmetric flow, another flow 01 is an attack flow and a third flow 10 is an asymmetric flow, as shown in FIG. 19A. The asymmetric flow's outgoing packets exit the network at gateway G1 and the incoming packets enter at gateway G2. The result of deploying the single gateway subnet detection scheme in this network is shown in FIG. 19B. In the Figure, the left digit of the flow identifier is mapped to the row of the counters shown and the right digit of the flow identifier is mapped to the column of the counters. As expected, the single gateway detection system would flag flow 01 as an attack flow. However, as seen in the Figure it will also flag flow 10 as an attack, even though that flow is legitimate.

Extensions to the invention may be applied so as to detect attacks accurately even in the presence of legitimate asymmetric flows. To do so, it is assumed that aggregate flow rates to subnets do not vary abruptly and the duration of a bandwidth subnet attack is long, e.g., on the order of minutes. Under this assumption, overlay nodes may perform packet updates delayed in time and space to distinguish between malicious and legitimate asymmetric flows. More specifically, during an interval, each overlay node collects information that identifies all asymmetric flows in its traffic. During succeeding intervals, other overlay nodes use this information to identify incoming asymmetric flows and, armed with knowledge received from other nodes, identify which of the asymmetric flows are actually attack flows.

Figure 20:
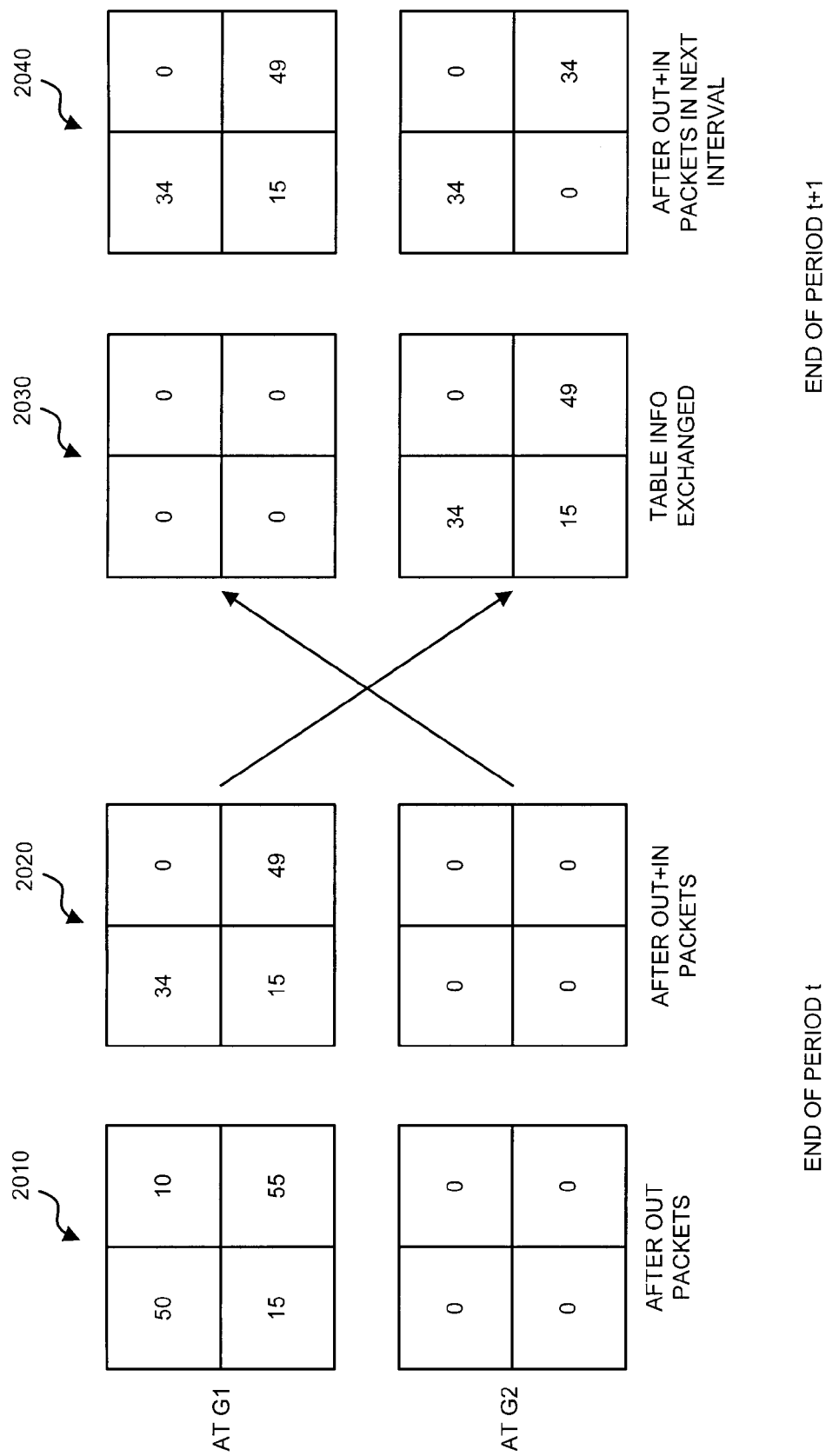
FIG. 20 is a block diagram illustrating aspects of counter operation and information exchange in accordance with exemplary embodiments of the present invention.

Referring to FIG. 20, aspects of the invention directed to determining subnet attack flows in the presence of legitimate asymmetric flows is illustrated. The counters at each monitor G1, G2 after counting incoming packets are illustrated at 2010 and after the counters have been decremented to account for outgoing packets at 2020. At the end of period t, each monitor receives information from the other monitors about asymmetric flows recorded at those monitors, as shown at 2030. If legitimate asymmetric flows are active over multiple intervals, such as shown at 2040, the monitor system can ascertain the legitimate incoming asymmetric flows from the information it receives from the other monitors.

In certain embodiments of the invention, monitors are deployed at all the gateways in the network. Each monitor in the extended network has 2 pairs of IP-indexed tables and hash-indexed tables. All tables are of equal dimensions. The first pair will be referred to as the symmetric IP-indexed and hash-indexed table and the second pair will be referred to as the asymmetric IP-indexed and hash-indexed table. The mapping between a flow and a table is the same as previously described. Like the hash-indexed table in the previously described embodiments, symmetric and asymmetric hash-indexed tables use a hash function to map flows to entries in the tables. This mapping function is the same for both tables. In fact, in certain embodiments of the invention, all monitors use the same mapping function for the hash-indexed tables.

Each monitor uses its symmetric tables to detect asymmetric flows in its traffic. Symmetric tables are updated in the same manner as the IP-indexed and hash-indexed table as in the previously described embodiments, i.e., they are updated at the monitor locally using packet samples. Thus, the counters of symmetric tables corresponding to asymmetric flows behave in the same manner as the counters corresponding to attacks in the single gateway case. Periodically, each monitor computes increments in the values of these counters over the evaluation period. At the end of the period, these increments are added to corresponding counters in the asymmetric tables at all monitors. Thus asymmetric tables at all monitors have the state of all outgoing asymmetric flows, legitimate and attacks, that are active in the previous interval. During the current interval, each monitor uses the asymmetric tables to identify legitimate asymmetric flows that enter the network at the monitor. The invention uses the packets of these flows to decrement the counters accordingly, such as described above. Thus, using the asymmetric tables, the monitors collectively identify legitimate asymmetric flows and detect attacks. In the following descriptions as to how the tables are updated, the updates are described using only symmetric and asymmetric IP-indexed tables, or simply symmetric and asymmetric tables. Any update to the entries of an IP-indexed table will result in a similar update to entries in the corresponding hash-indexed table. The only difference would be what entries are updated. This is determined by the flow address for the IP-indexed table and the hash of the flow address for the hash-indexed table, as described above.

A monitor's per-packet processing component uses sampled packets to update the symmetric table. When the monitor samples an outgoing packet, it increments fields of the symmetric table corresponding to the packet by one. If the packet is incoming, the same fields are decremented by the value κ, if all the fields are at least κ. If not, it decrements the corresponding fields in the asymmetric table by the value κ, again only if all of these fields are at least κ. Otherwise, the incoming packet is ignored. As previously mentioned, κ may be set to the maximum acceptable ratio of outgoing-to-incoming packet ratio for legitimate TCP flows in the network. In certain embodiments of the invention, the value for κ is set to 3.

The per-packet updates to the symmetric tables are identical to the per-packet updates to the tables in the single gateway embodiment. Recall from a previous discussion, that the entries in the tables corresponding to an asymmetric flow have net increments. In the single gateway network, the asymmetric flows at the gateway are attacks. In the multi-gateway network, asymmetric flows at a gateway may be attacks or legitimate. Thus, due to the update mechanism described above, only entries of the symmetric table that correspond to either attacks or outgoing components of legitimate asymmetric flows will have net increments. If symmetric tables at all monitors are combined, then the entries of this aggregate symmetric table will identify all asymmetric flows in the network. The periodic processing function at the monitor uses this aggregated symmetric table to update its asymmetric table, which in turn distinguishes between legitimate asymmetric flows and attack flows.

The aspects of periodic processing for the multi-homed case proceeds as follows. The symbols $S_m(t)$ and $A_m(t)$ will represent respectively the symmetric and asymmetric tables at a monitor m at the end of interval t. At the beginning of interval t+1, the periodic processing component of monitor m computes increment table $\Delta S_m(t)$ as follows:

$$\Delta S_m(t) = S_m(t) - S_m(t-1),$$

where monitor m reports its increment table to a designated monitor referred to as the rendezvous node. The rendezvous node, on receiving the increment tables for a period t from all monitors, computes the aggregate increment table, $\Delta S(t)$, by adding all of the increment tables together. The aggregate increment table values, as mentioned above, reflects the state of asymmetric flows in the network during period t. The rendezvous node sends the aggregate increment table to all the monitors. After monitor m receives the aggregate increment table for period t it adds the table to its asymmetric table $A_m(t)$, resulting in a $A_m(t+\delta)$.

During interval t+1, the per-packet processing component of monitor m updates the asymmetric table, as described above. An incoming packet of flow f at m decrements corresponding entries in $S_m(t)$ if all these entries have values greater than κ. If the packet fails to decrement the counter, ignoring the effects of aggregation, it means one of two things. First, decrements by f's previous incoming packets equal the increments by its outgoing packets received in the stream thus far. This could occur in the single gateway version, too. A more interesting reason why the decrement fails is that f is an asymmetric flow. Flow f's outgoing packets exit the network at a gateway other than at m and its incoming packets enter the network at m. Since its outgoing packets did not increment counters in $S_m(t)$, its incoming packets cannot decrement these counters in the table. However, the aggregate increment table and consequently $A_m(t+\delta)$, have counters that have been incremented by the outgoing packets of f. Hence, incoming packets of f will be able to decrement corresponding counters of $A_m(t+\delta)$. If f has excess incoming packets, these packets will be unable to decrement counters of $A_m(t+\delta)$ just as excess packets of asymmetric flow at m cannot decrement counters of $S_m(t)$.

At the end of interval (t+1), incoming packets of f would have decremented the increments due to f's outgoing packets elsewhere, if f is legitimate. For each asymmetric flow in the network, its incoming packets during interval t+1 would have compensated at some monitor the increments due to its packets outgoing at some other monitor during an interval t. The attack flows would not, however, have significant incoming packets. Hence, their corresponding counters and asymmetric tables would not be adequately decremented at any of the monitors. Consequently, the monitors coordinate and detect counters of asymmetric tables that exhibit net increments at all monitors during interval t+1.

Monitors use only the asymmetric IP-indexed table to detect outgoing attacks and identify victims. At the end of each interval t, monitor m, in similar fashion to the increment table, computes a decrement table, $\Delta A_m(t)$:

$$\Delta A_m(t) = A_m(t) - A_m(t-1+\delta),$$

where m sends its decrement table to the rendezvous node. The rendezvous node computes the aggregate decrement table $\Delta A(t)$ by adding all the decrement tables for period t. The rendezvous node sums the aggregate increment table for period t−1 and the aggregate decrement table for period t to result in the anomaly table $\Gamma(t)$ for period t:

$$\Gamma(t) = \Delta S(t-1) + \Delta A(t).$$

Figure 21:
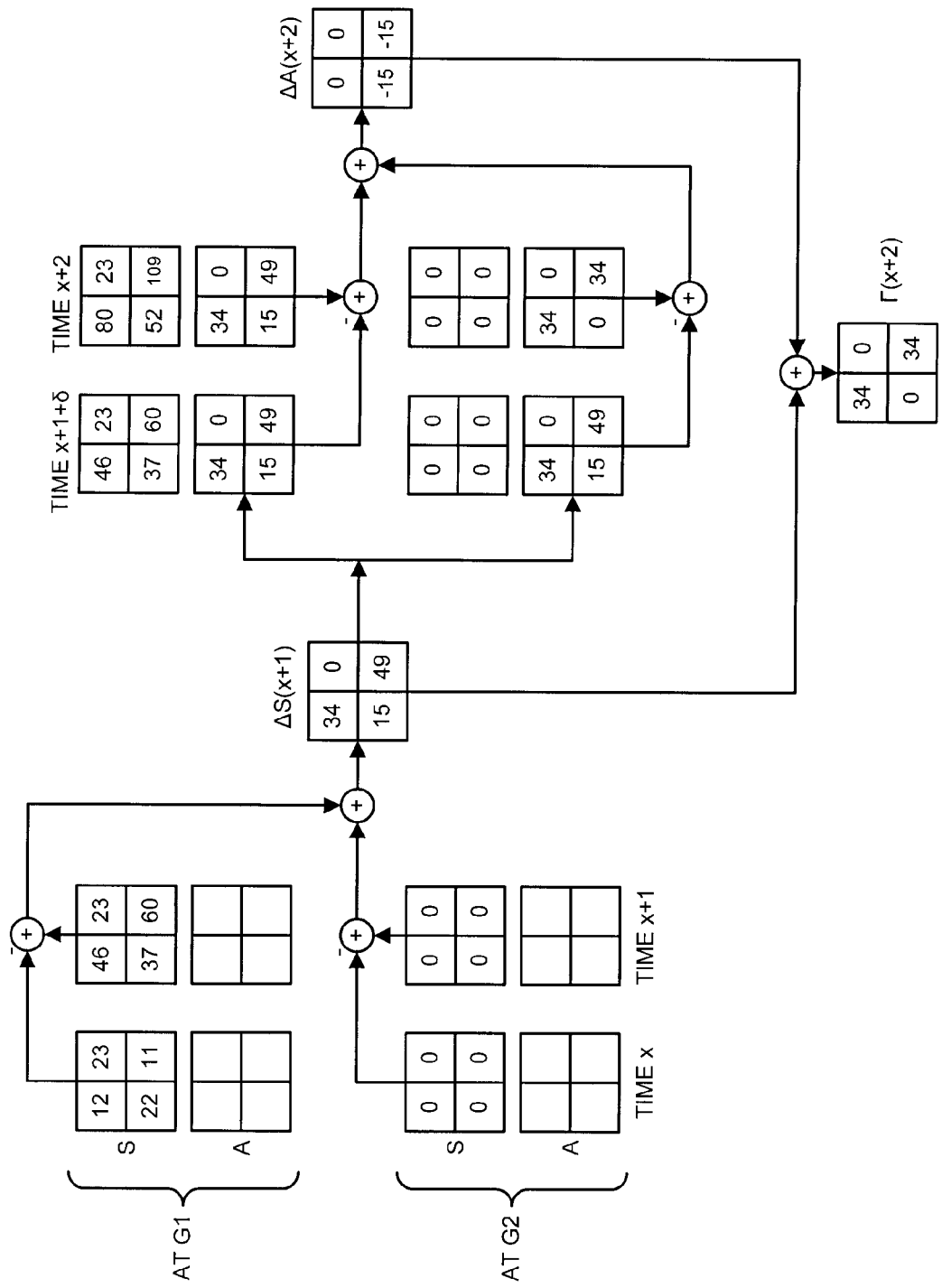
FIG. 21 is a block diagram illustrating exemplary operations for detecting an attack against a subnet in accordance with aspects of the present invention.

The steps for the periodic processing previously described in terms of its underlying mathematical computations are diagrammatically illustrated in FIG. 21. The active flows and their flow rates are those as shown in FIG. 19A. The state of the tables at the end of intervals x is as shown in FIG. 21. Due to the outgoing and incoming packets of flows 00, 01 and 10, the per-packet processing at monitor G1 results in the state after interval x+1 as is shown in the Figure. Since there are no outgoing packets at monitor G2, per-packet processing at G2 does not change the state of its table $S_2(x)$. At the end of interval x+1, $\Delta S(x+1)$ is computed and added to the tables $A_1(x+1)$ and $A_2(x+1)$. During the interval x+2, the per-packet processing at G2 will decrement the corresponding counters in the table $A_2(x+1+\delta)$ responsive to incoming packets of flow 10 resulting in the table $A_2(x+2)$. Table $S_1(x+2)$ remains unchanged. As in the Figures, table $\Delta A(x+2)$ is computed at the end of interval X+2 using the states of tables $A_1$ and $A_2$ at times x+1+δ and x+2. Note that $\Gamma(x+2)$ is computed by simply adding $\Delta A(x+2)$ and $\Delta S(x+1)$. $\Gamma(x+2)$'s entries correspond to flow 01 and demonstrate that the flow is an attack.

Attacks cause increments in the counters of the Γ table, as described above. Flow aggregation, as described above, will also result in some counters that do not correspond to attacks showing net increments for brief periods of time. Flow scoring described for single gateway detection embodiments are relied upon to distinguish between counter increments corresponding to attacks and counter increments corresponding to flow aggregation. A score is computed over time for each of the counters in the Γ table and the scores are used to detect subnets under attack.

Figure 22:
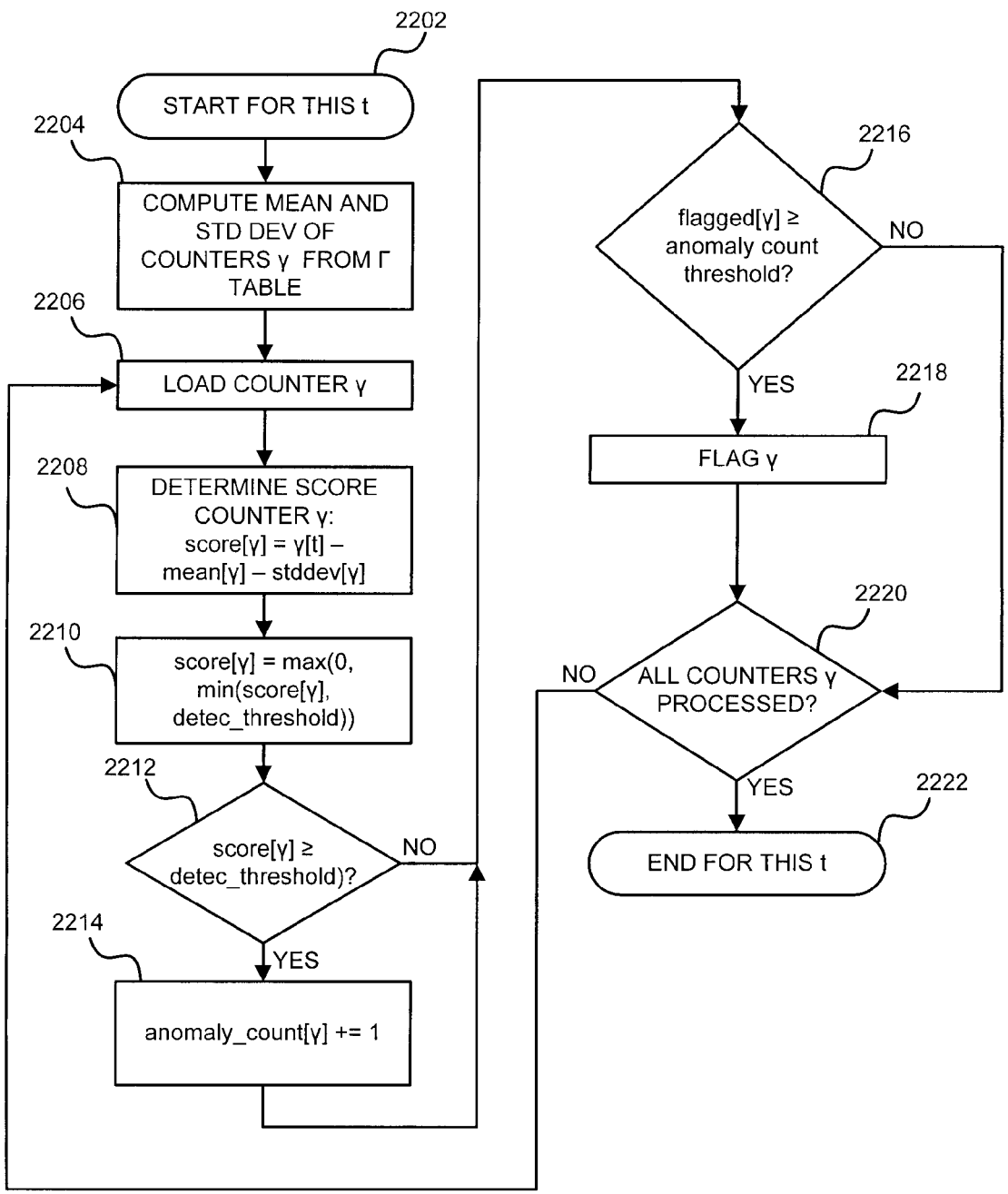
FIG. 22 is a flow diagram illustrating exemplary method steps for periodic processing to detect attacks against subnets in accordance with aspects of the present invention.

Referring now to FIG. 22, there is shown an exemplary procedure for scoring flows to detect subnet attacks in the presence of asymmetric traffic. At each interval t, the process is entered at block 2202 and flow is transferred to block 2204, where the mean and standard deviation of the anomalies γ in the anomaly table Γ are computed. Process flow proceeds to block 2206, where a anomaly entry γ is loaded for processing. The score for counter γ is updated in block 2208 as score(γ) =γ(t)−mean(γ)−stddev(γ). At block 2210, the score is upper-bounded by zero or the detection threshold, whichever is the largest. The process proceeds to block 2212, where it is determined whether the score exceeds the detection threshold. If so, the process is transferred to block 2214, where the anomaly count is incremented by one. If the score is below the detection threshold, a determination is made as to whether a flagged counter exceeds the anomaly count threshold in block 2216. If so, the counter is identified as being an attack flow in block 2218. Otherwise, the process proceeds to block 2220, where it is determined if all counters in the anomaly table have been processed. If not, another counter is loaded at block 2206. Otherwise, the process ends at block 2222.

As was demonstrated in the single gateway case, the embodiments for the multiple gateway case described above computes the average and standard deviation over all entries in Γ(t) that have a positive value. These values are used as a baseline for calculating the instantaneous scores for counters in Γ for a period t. Instantaneous score of a counter is the counter score for the period for which it was computed and is added to the counter's actual score.

An anomaly count for counters is an additional feature to the attack detection phase in multi-gateway networks and is used for the following reason. In typical applications, the assumption that asymmetric flows exist for long periods is not always true; such flows may be of short duration and may have decreasing flow rates over time. Both effects can result in increments to corresponding counters that will not be sufficiently decremented during the next interval. As a result, the score for such a counter will increase during consecutive intervals and will eventually cross the detection threshold. However, the score will fall below the score threshold as soon as the flow ceases to exist, which is typically 1 or 2 intervals after the flow starts. On the other hand, a bandwidth attack is active over several intervals and hence, the scores of corresponding counters will be above the threshold for several intervals. Thus, a threshold for a number of intervals when a score is above the detection threshold can differentiate between attack flows and short duration asymmetric flows, such a threshold is referred to as the anomaly count threshold. When a counters anomaly count crosses the anomaly count threshold, the counter is flagged as belonging to an attack.

The present invention is a source domain DDoS detection system that cam be implemented without changing the existing routing infrastructure in the network. The present invention is flexible and can detect various types of attacks with both individual victims and subnets as intended targets. Since, typically, most stub domains do not have high rates of asymmetry, knowledge of this allows system parameters to be tuned to increase detection sensitivity of the system. The present invention has nearly zero false positives and explicitly preserves the router fast path, thus increasing its applicability to high performance networks.

The descriptions above were directed to the detection of TCP-based attacks that originate in a subnet. However, other protocols are considered within the scope of the invention. Additionally, the present invention can detect not just DDoS flows, but other types of malicious traffic in the network with suitable choices of implementation details.

The descriptions above are intended to illustrate possible implementations of the present invention and are not restrictive. Many variations, modifications and alternatives will become apparent to the skilled artisan upon review of this disclosure. For example, components equivalent to those shown and described may be substituted therefore, elements and methods individually described may be combined and elements described as discrete may be distributed across many components. The scope of the invention should therefore be determined not with reference to the description above, but with reference to appended claims, along with their full range of equivalents.

What is claimed is:

1. A method for detecting malicious communication traffic at an autonomous network domain comprising:
    sampling packets of a plurality of flows at each of a plurality of routing nodes in the autonomous network domain, each of said flows including incoming packets having a common source address and outgoing packets having a common destination address;
    providing in memory at each of said routing nodes an IP-mapped symmetric flow table of counters and an IP-mapped asymmetric flow table of counters, each counter of said IP-mapped symmetric flow table and said IP-mapped asymmetric flow table mapped to at least a portion of a corresponding internet protocol address;
    providing in said memory at each of said routing nodes a hashed-mapped symmetric flow table of counters and a hashed-mapped asymmetric flow table of counters, each counter of said hash-mapped symmetric flow table and said hash-mapped asymmetric flow table mapped by a hashing function of said internet protocol address;
    counting at each of said routing nodes said sampled packets into at least one counter mapped to an at least partially randomized distribution of said plurality of flows;
    updating said counters in said IP-mapped symmetric flow table, said hash-mapped symmetric flow table, said IP-mapped asymmetric flow table and said hash-mapped asymmetric flow table responsive to said sampled packets in said counting step;
    aggregating at each of said routing nodes said IP-mapped symmetric flow table and said hash-mapped symmetric flow table of others of said routing nodes;
    adding at each of said routing nodes said counters of said aggregated IP-mapped symmetric flow table to corresponding said counters in said IP-mapped asymmetric flow table and said counters of said aggregated hash-mapped symmetric flow value to said hash-mapped asymmetric flow table;
    determining at each of said routing nodes a residual count of said outgoing packets exceeding said incoming packets;
    transmitting said count from each of said routing nodes to at least one rendezvous node;
    aggregating at said rendezvous node said IP-mapped asymmetric flow table and said hash-mapped asymmetric flow table from said routing nodes; and
    determining at said at least one rendezvous node at least one flow identifier of an attack flow by determining from said aggregated IP-mapped asymmetric flow table and said aggregated hash-mapped asymmetric flow table at said rendezvous node said attack flow.

2. The method for detecting malicious communication traffic as recited in claim 1 further including decrementing said counter upon receiving an incoming packet and incrementing said counter when receiving an outgoing packet.

3. The method for detecting malicious communication traffic as recited in claim 2 further decrementing said counter by a value greater than a value used for incrementing said counter.

4. The method for detecting malicious communication traffic as recited in claim 3, where said decrementing value is a maximum allowable outgoing-to-incoming packet ratio.

5. The method for detecting malicious communication traffic as recited in claim 4, where said decrementing is performed responsive to said incoming packet only when all values in a memory table of such counters are at least equal to said decrementing value.

6. The method for detecting malicious communication traffic as recited in claim 1 where said counting step includes:
    providing a first plurality of counters each addressable in accordance with a first mapping;
    providing a second plurality of counters each addressable in accordance with a second mapping;
    incrementing by a first value at least one of said first counters responsive to said sampling one of said outgoing packets;
    decrementing by a second value greater than said first value said first counters responsive to said sampling one of said incoming packets and all of said first counters being at least said second value; and
    neither incrementing nor decrementing said first counters responsive to said sampling one of said incoming packets if less than all of said first counters are at least said second value.

7. The method for detecting malicious communication traffic as recited in claim 6, where said providing said first plurality of counters includes respectively mapping an internet protocol address to said first counters as said first mapping and said providing said second plurality of counters includes respectively mapping by a hashing function of said internet protocol address to said second counters as said second mapping.

8. The method for detecting malicious communication traffic as recited in claim 7, where said internet protocol address mapping includes mapping segments of said internet protocol address to a set of said first counters such that more than one of said segments is mapped to one of said first counters of said set.

9. The method for detecting malicious communication traffic as recited in Claim 1, where said counter updating includes:
    incrementing by a first value at least one of said counters in said IP-mapped symmetrical flow table and at least one of said counters in said hash-mapped symmetric flow table responsive to said sampling one of said outgoing packets;
    decrementing by a second value greater than said first value said counters in said IP-Mapped symmetrical flow table and said counters in said hash-mapped symmetric flow table responsive to said sampling one of said incoming packets and all of said counters in said IP-mapped symmetrical flow table and all of said counters in said hash-mapped symmetric flow table being at least said second value;
    decrementing by said second value said one of said counters in said IP-mapped asymmetrical flow table and said one of said counters in said hash-mapped asymmetric flow table responsive to:
        said sampling one of said incoming packets;
        less than all of said counters in said IP-mapped symmetrical flow table or less than all of said counters in said hash-mapped symmetric flow table being at least said second value; and
        all of said counters in said IP-mapped asymmetrical flow table and all of said counters in said one of said counters in said hash-mapped asymmetric flow table being at least said second value; and
    neither incrementing nor decrementing said counters in said IP-mapped symmetrical flow table and said counters in said hash-mapped symmetric flow table responsive to said sampling one of said incoming packets if less than all of said counters in said IP-mapped symmetrical flow table and less than all of said counters in said hash-mapped symmetric flow table are at least said second value.

* * * * *